United States Patent
Mo et al.

(10) Patent No.: US 11,237,345 B2
(45) Date of Patent: Feb. 1, 2022

(54) OPTICAL BACKPLANE SYSTEM, SWITCHING SYSTEM, AND SWITCHING SYSTEM UPGRADE METHOD

(71) Applicant: HUAWEI TECHNOLOGIES CO., LTD., Shenzhen (CN)

(72) Inventors: Daochun Mo, Shenzhen (CN); Qingzhi Liu, Beijing (CN); Xiaofei Xu, Beijing (CN); Wenyang Lei, Beijing (CN); Chuang Wang, Beijing (CN); Linchun Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 16/888,121

(22) Filed: May 29, 2020

(65) Prior Publication Data
US 2020/0292770 A1 Sep. 17, 2020

Related U.S. Application Data

(63) Continuation of application No. PCT/CN2018/115922, filed on Nov. 16, 2018.

(30) Foreign Application Priority Data

Nov. 29, 2017 (CN) .......................... 201711229828.4

(51) Int. Cl.
- *G02B 6/43* (2006.01)
- *H04B 10/80* (2013.01)
- *H04Q 11/00* (2006.01)

(52) U.S. Cl.
CPC ............. *G02B 6/43* (2013.01); *H04B 10/801* (2013.01); *H04Q 11/0005* (2013.01); *H04Q 2011/0052* (2013.01)

(58) Field of Classification Search
CPC ........ G02B 6/43; H04B 10/801; H04B 10/25; H04B 10/40; H04Q 11/0005; H04Q 2011/0052
See application file for complete search history.

(56) References Cited

U.S. PATENT DOCUMENTS

| | | | |
|---|---|---|---|
| 5,469,518 A | 11/1995 | Song et al. | |
| 6,334,784 B1 * | 1/2002 | Howard | G02B 6/4201 439/260 |

(Continued)

FOREIGN PATENT DOCUMENTS

| | | |
|---|---|---|
| CN | 2874537 Y | 2/2007 |
| CN | 102809784 A | 12/2012 |

(Continued)

OTHER PUBLICATIONS

Reference number list for U.S. Patent Application Publication No. 2020/0292770 of MO et al. (MO, the present application) (Year: 2021).*

*Primary Examiner* — Andrew Jordan
(74) *Attorney, Agent, or Firm* — Leydig, Voit & Mayer, Ltd.

(57) ABSTRACT

This application discloses an optical backplane system, which includes a first upper-level optical interconnection module, a first lower-level optical interconnection module, and a second lower-level optical interconnection module. The first upper-level optical interconnection module includes M1 first interfaces and N1 second interfaces in connection relationships. The first lower-level optical interconnection module includes L1 third interfaces and K1 fourth interfaces in connection relationships. The second lower-level optical interconnection module includes L2 third interfaces and K2 fourth interfaces in connection relationships. The first upper-level optical interconnection module is connected to one of the L1 third interfaces of the first (Continued)

lower-level optical interconnection module by using one of the N1 second interfaces. The first upper-level optical interconnection module is connected to one of the L2 third interfaces of the second lower-level optical interconnection module by using another one of the N1 second interfaces.

21 Claims, 22 Drawing Sheets

(56) References Cited

U.S. PATENT DOCUMENTS

| | | | | |
|---|---|---|---|---|
| 7,142,746 | B2* | 11/2006 | Look | G02B 6/43 385/24 |
| 9,148,220 | B2* | 9/2015 | Sheu | H04B 10/25 |
| 10,571,635 | B1* | 2/2020 | Leigh | G02B 6/35 |
| 10,805,107 | B2* | 10/2020 | Xu | H04Q 11/0005 |
| 2005/0213989 | A1 | 9/2005 | English et al. | |
| 2006/0051015 | A1* | 3/2006 | Look | G02B 6/43 385/24 |
| 2011/0116755 | A1 | 5/2011 | Rolston | |
| 2014/0355999 | A1* | 12/2014 | Sheu | H04B 10/25 398/142 |
| 2019/0222436 | A1* | 7/2019 | Xu | H04Q 11/0062 |
| 2020/0073061 | A1* | 3/2020 | Leigh | G02B 6/35 |
| 2020/0292770 | A1* | 9/2020 | Mo | H04B 10/25 |

FOREIGN PATENT DOCUMENTS

| | | |
|---|---|---|
| CN | 104303088 A | 1/2015 |
| CN | 105376659 A | 3/2016 |
| CN | 106953816 A | 7/2017 |
| CN | 107113064 A | 8/2017 |
| WO | 2017118388 A1 | 7/2017 |

* cited by examiner

OPTICAL BACKPLANE SYSTEM, SWITCHING SYSTEM, AND SWITCHING SYSTEM UPGRADE METHOD

CROSS-REFERENCE TO RELATED APPLICATIONS

This application is a continuation of International Application No. PCT/CN2018/115922, filed on Nov. 16, 2018, which claims priority to Chinese Patent Application No. 201711229828.4, filed on Nov. 29, 2017, The disclosures of the aforementioned applications are hereby incorporated by reference in their entireties.

TECHNICAL FIELD

This application relates to the field of communications technologies, and in particular, to an optical backplane system, a switching system, and a switching system upgrade method.

BACKGROUND

A backplane is an important component of a network switching device, and a main function is to implement cross-connection between a line processing unit and a switch fabric unit. The backplane may be classified into an optical backplane and an electrical backplane based on different used transmission mediums. For the two types of backplanes, the optical backplane can achieve a higher system capacity, and therefore is increasingly widely applied.

The optical backplane usually includes a bearing plate and a plurality of line processing unit slots disposed on the bearing plate. Each line processing unit slot is connected to the switch fabric unit by using a particular quantity of optical channels. If the optical backplane does not include a sufficient quantity of optical channels, the optical backplane needs to be replaced with a new optical backplane including more optical channels, or an entire cabinet needs to be replaced. In a replacement process, a device needs to be powered off, resulting in service interruption.

SUMMARY

This application provides an optical backplane system, a switching system, and a switching system upgrade method, to resolve a problem that services of an entire optical backplane and even an entire cabinet need to be interrupted in an optical backplane upgrade process. The technical solutions are as follows:

According to one aspect, this application provides an optical backplane system. The optical backplane system includes a first upper-level optical interconnection module, a first lower-level optical interconnection module, and a second lower-level optical interconnection module. The first upper-level optical interconnection module includes M1 first interfaces and N1 second interfaces, and there are connection relationships between the M1 first interfaces and the N1 second interfaces. The first lower-level optical interconnection module includes L1 third interfaces and K1 fourth interfaces, and there are connection relationships between the L1 third interfaces and the K1 fourth interfaces. The second lower-level optical interconnection module includes L2 third interfaces and K2 fourth interfaces, and there are connection relationships between the L2 third interfaces and the K2 fourth interfaces. The first upper-level optical interconnection module is connected to one of the L1 third interfaces of the first lower-level optical interconnection module by using one of the N1 second interfaces. The first upper-level optical interconnection module is connected to one of the L2 third interfaces of the second lower-level optical interconnection module by using another one of the N1 second interfaces. All the M1 first interfaces, the K1 fourth interfaces, and the K2 fourth interfaces are configured to connect to processing modules, where all M1, N1, K1, K2, L1, and L2 are integers greater than 1.

The optical backplane system is disposed by connecting an upper-level optical interconnection module and lower-level optical interconnection modules, so that when the system needs to be upgraded, only the lower-level optical interconnection modules need to be replaced one by one, and when a lower-level optical interconnection module is replaced, no impact is caused to a service carried on another lower-level optical interconnection module, thereby avoiding a problem that all services of the entire optical backplane system need to be interrupted.

The processing module includes but is not limited to a line processing unit (LPU), a switch fabric unit (SFU), an access & convergence unit (ACU), a coding & decoding unit (CDU), a deep packet inspection unit (DPIU), and a service awareness unit (SAU).

In an optional embodiment, the processing modules connected to the first interfaces are line processing units, and the processing modules connected to the fourth interfaces are switch fabric units or line processing units having a switching function.

Optionally, L1 may be equal to L2, or L1 may be unequal to L2. A specification of a lower-level optical interconnection module, namely, a quantity of third interfaces of the lower-level optical interconnection module, may be selected based on an actual need.

Optionally, the optical backplane system may further include a second upper-level optical interconnection module. The second upper-level optical interconnection module includes M2 first interfaces and N2 second interfaces, and there are connection relationships between the M2 first interfaces and the N2 second interfaces. The second upper-level optical interconnection module is connected to one of the L1 third interfaces of the first lower-level optical interconnection module by using one of the N2 second interfaces. The second upper-level optical interconnection module is connected to one fourth interface in the L2 third interfaces of the second lower-level optical interconnection module by using another one of the N2 second interfaces. The M2 first interfaces are configured to connect to processing modules, where both M2 and N2 are integers greater than 1.

Optionally, M1 may be equal to M2, or M1 may be unequal to M2.

In some embodiments, the first upper-level optical interconnection module may include a plurality of first optical channel sets, each first optical channel set includes N1 groups of first optical channels, the N1 groups of first optical channels are connected to the N1 second interfaces in a one-to-one correspondence, and each first optical channel set is connected to at least one of the M1 first interfaces.

Each first interface may include one or more optical connectors. The second interface may also include one or more optical connectors. During implementation, a quantity of first optical channels connected to a single second interface may be greater than or equal to a quantity of first optical channels connected to a single first interface. Therefore, there may be the following configurations: a quantity of optical channels connected to a single optical connector of the first interface is equal to a quantity of optical channels connected to a single optical connector of the second interface, and a quantity of optical connectors of the second interface is equal to a quantity of optical connectors of the first interface; or a quantity of optical channels connected to a single optical connector of the first interface is equal to a quantity of optical channels connected to a single optical connector of the second interface, and a quantity of optical connectors of the second interface is greater than a quantity of optical connectors of the first interface; or the second interface and the first interface include a same quantity of optical connectors, but a single optical connector of the second interface is connected to a larger quantity of optical channels; or a quantity of optical connectors of the second interface is greater than a quantity of optical connectors of the first interface, and a single optical connector of the second interface is connected to a larger quantity of optical channels. In addition, when there are a relatively large quantity of lower-level optical interconnection modules, there may be a case in which a quantity of first optical channels connected to a single second interface is less than a quantity of first optical channels connected to a single first interface.

In this embodiment of this application, one processing module usually includes a plurality of processing units, and one first optical channel set may be configured to transmit a signal of one processing unit. When each first optical channel set is connected to Y first interfaces in the M1 first interfaces, and first optical channels correspondingly connected to the Y first interfaces form Y first optical channel sets, first optical channel sets needed by a same processing module may be connected to the Y first interfaces, so that after a processing module is connected to the Y first interfaces, processing units of the processing module are respectively connected to the second interfaces of the first upper-level optical interconnection module, and are further connected to another processing module, for example, a switching module, by using a lower-level optical interconnection module connected to the second interfaces.

Further, each first optical channel set is connected to one of the M1 first interfaces.

When one first optical channel set is connected to one first interface, a quantity of the first interfaces may correspond to a quantity of the processing units. Then, a corresponding quantity of first interfaces may be selected and connected to a processing module based on a quantity of included processing units and/or a scale of a processing unit (for example, a quantity of transceivers of the processing unit), so that this can be applied to processing modules of different specifications, and a resource waste can be avoided.

In some other embodiments, the first lower-level optical interconnection module further includes L1 second optical channel sets, the L1 second optical channel sets are connected to the L1 third interfaces in a one-to-one correspondence, each second optical channel set includes a plurality of groups of second optical channels, and each group of second optical channels in the L1 second optical channel sets is correspondingly connected to one of the K1 fourth interfaces. The second lower-level optical interconnection module further includes L2 second optical channel sets, the L2 second optical channel sets are connected to the L2 third interfaces in a one-to-one correspondence, each second optical channel set includes a plurality of groups of second optical channels, and each group of second optical channels in the L2 second optical channel sets is correspondingly connected to one of the K2 fourth interfaces.

Optionally, each of the L1 second optical channel sets includes K1 groups of second optical channels, and each of the L2 second optical channel sets includes K2 groups of second optical channels. Each group of second optical channels includes a plurality of second optical channels.

Because each second optical channel set is correspondingly connected to one third interface, and each group of second optical channels in each second optical channel set is correspondingly connected to one fourth interface, there are second optical channels connected between each third interface and each fourth interface. When each processing unit of a processing module is connected to each lower-level optical interconnection module by using an upper-level optical interconnection module, each processing unit may find, by using one switching unit, another processing unit connected to the optical backplane system, and exchange data with the processing unit, to implement single-level switching.

Optionally, the K1 fourth interfaces are grouped into X1 groups, the L1 third interfaces are grouped into X1 groups, X1 is an integer greater than 1, each group of fourth interfaces in the K1 fourth interfaces are connected to a corresponding group of third interfaces, the first lower-level optical interconnection module further includes a plurality of fifth interfaces, and the X1 groups of fourth interfaces are connected to each other by using the fifth interfaces of the first lower-level optical interconnection module. The K2 fourth interfaces are grouped into X2 groups, the L2 third interfaces are grouped into X2 groups, X2 is an integer greater than 1, each group of fourth interfaces in the K2 fourth interfaces are connected to a corresponding group of third interfaces, the second lower-level optical interconnection module further includes a plurality of fifth interfaces, and the X2 groups of fourth interfaces are connected to each other by using the fifth interfaces of the second lower-level optical interconnection module. Different groups of fourth interfaces are connected by using the fifth interfaces, so that multi-level switching can be implemented, to obtain a higher-capacity optical backplane system.

In an implementation, the fourth interfaces may be grouped into two groups, and each of the plurality of fifth interfaces is connected to each fourth interface, to implement three-level switching. In another implementation, the plurality of fifth interfaces may be grouped into at least two levels. Grouping is performed for fifth interfaces at each level other than fifth interfaces at the last level, and a quantity of groups of fifth interfaces decreases level by level from the first level of fifth interfaces to the last level of fifth interfaces. The fifth interfaces at the first level are connected to the fourth interfaces, fifth interfaces at a current level are connected to fifth interfaces at a previous level, the fifth interfaces at the last level are respectively connected to fifth interfaces at the last but one level, and one group of fifth interfaces in fifth interfaces at a current level are connected to at least two groups of fifth interfaces in fifth interfaces at a previous level, so that switching of more than three levels can be implemented by connecting different groups of fourth interfaces by using the plurality of levels of fifth interfaces.

In still some other embodiments, the first lower-level optical interconnection module further includes a first panel, and the L1 third interfaces and at least some of the K1 fourth interfaces are disposed on the first panel of the first lower-level optical interconnection module; or the second lower-level optical interconnection module further includes a first panel, and the L2 third interfaces and at least some of the K2 fourth interfaces are disposed on the first panel of the second lower-level optical interconnection module.

Optionally, the optical backplane system further includes a support frame, a plurality of interface fastening slots are disposed on the support frame, and the fourth interfaces disposed on the first panel are disposed in the interface fastening slots, so that the fourth interfaces are connected to fiber interfaces (that is, fiber interfaces configured to connect processing modules and a lower-level optical interconnection module) of processing modules in the interface fastening slots. When a lower-level optical interconnection module needs to be replaced, a new lower-level optical interconnection module can be connected to all fiber interfaces in the interface fastening slots at a time, and no re-arrangement, re-plugging, or re-removal needs to be performed on the optical interfaces, so that an operation is simplified, time is reduced, and working efficiency is improved.

Further, upper-level optical interconnection module support slots are further disposed on the support frame, the upper-level optical interconnection module support slots are located on a first region of the support frame, for example, an upper region of the support frame, and the plurality of interface fastening slots are located on a second region of the support frame, for example, a lower region of the support frame. The upper-level optical interconnection module support slots are disposed on the support frame, so that a new lower-level optical interconnection module can be connected to all fiber interfaces in the interface fastening slots and the upper-level optical interconnection module in the upper-level optical interconnection module support slots at a time, thereby further improving working efficiency.

In some embodiments, the support frame includes a first support plate, a second support plate, and a connection plate connecting the first support plate and the second support plate, the first support plate and the second support plate are located on different planes and are respectively located on two sides of the connection plate, the upper-level optical interconnection module support slots are located on the first support plate, and the plurality of interface fastening slots are located on the second support plate. Because a size of an upper-level optical interconnection module is relatively large, after an upper-level optical interconnection module is placed into an upper-level optical interconnection module support slot, to ensure mounting stability of the upper-level optical interconnection module, the first support plate supports a middle part of the upper-level optical interconnection module. In this case, the upper-level optical interconnection module extends out of the first support plate. The first support plate and the second support plate are disposed on different planes, so that second interfaces of the upper-level optical interconnection module and the fiber interfaces in the interface fastening slots are located on a same plane, to facilitate alignment.

In some embodiments, the first lower-level optical interconnection module and the second lower-level optical interconnection module have a same shape and a same size. Lower-level optical interconnection modules having a same shape and a same size are used, so that when the lower-level optical interconnection modules are plugged into a cabinet, a same limiting structure, for example, a same sliding slot, may be used, and no complex mounting structure needs to be configured in the cabinet. In addition, the lower-level optical interconnection modules having a same shape and a same size are easy to be stored and transported.

Optionally, the second interfaces and the third interfaces that are connected are directly connected or connected by using adapters. In this case, the upper-level optical interconnection module and the lower-level optical interconnection modules (including the first lower-level optical interconnection module and the second lower-level optical interconnection module) may be disposed in an orthogonal manner, to facilitate alignment and assembly of the upper-level optical interconnection module and the lower-level optical interconnection modules.

In still some other embodiments, a limiting and guiding apparatus is disposed between the first upper-level optical interconnection module and both the first lower-level optical interconnection module and the second lower-level optical interconnection module, to facilitate alignment and connection between the upper-level optical interconnection module and the lower-level optical interconnection modules.

Optionally, the second interfaces and the third interfaces that are connected are connected by using fibers or polymer optical waveguides, so that a scenario in which the upper-level optical interconnection module and lower-level optical interconnection modules need to be disposed separately can be met, and application can be more flexible.

According to another aspect, this application further provides a switching system, including processing modules and the optical backplane system described in the foregoing aspect, where the processing modules are connected to the optical backplane system.

Optionally, the processing modules and the optical backplane system are connected by using fibers or polymer optical waveguides. Connections using the fibers or the polymer optical waveguides can enable the processing modules and the optical backplane system to be disposed separately, for example, the processing modules and the optical backplane system are disposed in different cabinets, so that the processing modules and the optical backplane system can be connected based on an actual scenario requirement, and application can be more flexible.

According to still another aspect, this application further provides a switching system upgrade method, applicable to the foregoing switching system. The upgrade method includes: removing fiber interfaces of processing modules connected to a first lower-level optical interconnection module from the first lower-level optical interconnection module; removing the first lower-level optical interconnection module; plugging a new lower-level optical interconnection module into a position from which the first lower-level optical interconnection module is removed, where the new lower-level optical interconnection module includes more third interfaces and fourth interfaces than the first lower-level optical interconnection module; connecting the removed fiber interfaces of the processing modules and the new lower-level optical interconnection module, and connecting an unused fourth interface of the new lower-level optical interconnection module and a fiber interface of a new processing module; and sequentially replacing all lower-level optical interconnection modules in a manner of replacing the first lower-level optical interconnection module.

Further, the method may include: connecting a new upper-level optical interconnection module and third interfaces that are of the new lower-level optical interconnection module and to which no upper-level optical interconnection module is connected.

BRIEF DESCRIPTION OF DRAWINGS

FIG. 1b is a schematic structural diagram of a connection between a first upper-level optical interconnection module and a first lower-level optical interconnection module in the optical backplane system shown in FIG. 1a;

FIG. 1c is a schematic structural diagram of a connection between a first upper-level optical interconnection module and a second lower-level optical interconnection module in the optical backplane system shown in FIG. 1a;

FIG. 4b is a schematic diagram of signal transmission of the lower-level optical interconnection module shown in FIG. 4a;

FIG. 5b is a schematic assembly structural diagram of the optical backplane system shown in FIG. 5a;

FIG. 8b is a schematic structural diagram of an upper-level optical interconnection module fastening structure of the optical backplane system shown in FIG. 8a;

FIG. 8c is a schematic structural diagram of another upper-level optical interconnection module fastening structure of the optical backplane system shown in FIG. 8a;

DESCRIPTION OF EMBODIMENTS

To make the objectives, technical solutions, and advantages of this application clearer, the following further describes the implementations of this application in detail with reference to the accompanying drawings.

Figure 1A:
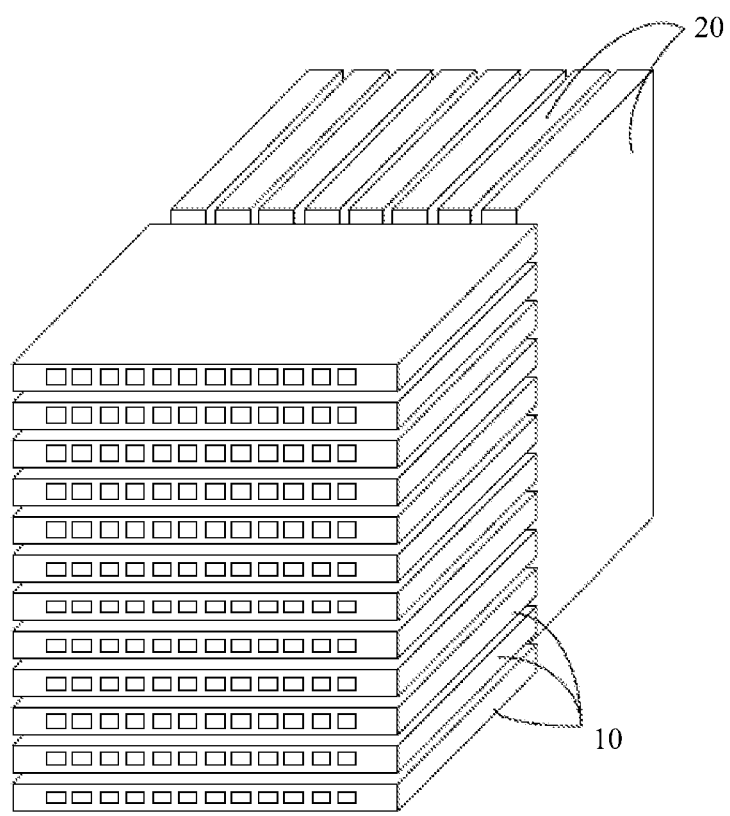
FIG. 1a is a schematic structural diagram of an optical backplane system according to an embodiment of the present invention.

An embodiment of the present invention provides an optical backplane system. FIG. 1a is a schematic structural diagram of the optical backplane system provided in this embodiment of the present invention. As shown in FIG. 1a, the optical backplane system includes a plurality of upper-level optical interconnection modules 10 and a plurality of lower-level optical interconnection modules 20. The plurality of upper-level optical interconnection modules 10 are connected to the plurality of lower-level optical interconnection modules 20.

The following describes a manner of a connection between the upper-level optical interconnection module 10 and the lower-level optical interconnection module 20 in the embodiments of the present invention by using a first upper-level optical interconnection module, a first lower-level optical interconnection module, and a second lower-level optical interconnection module as an example.

Figure 1B:
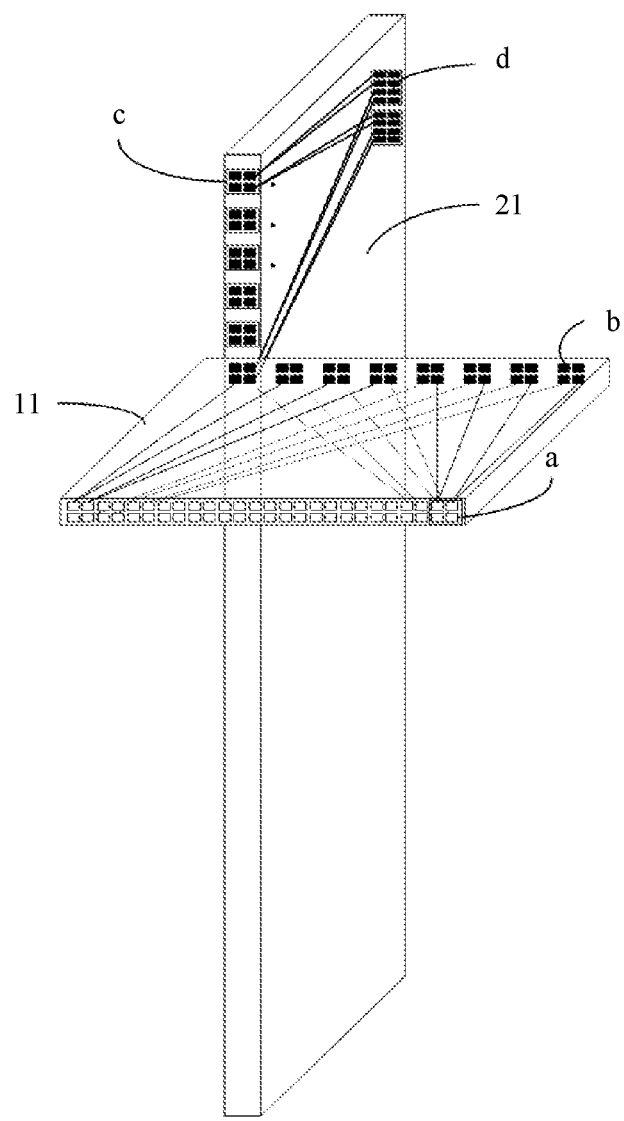

FIG. 1b is a schematic structural diagram of a connection between the first upper-level optical interconnection module and the first lower-level optical interconnection module. As shown in FIG. 1b, the first upper-level optical interconnection module 11 includes M1 first interfaces a, and N1 second interfaces b, and there are connection relationships between the M1 first interfaces a, and the N1 second interfaces b. The first lower-level optical interconnection module 21 includes L1 third interfaces c and K1 fourth interfaces d, and there are connection relationships between the L1 third interfaces c and the K1 fourth interfaces d. The first upper-level optical interconnection module 11 is connected to a third interface c (namely, the 6$^{th}$ third interface from top to bottom) in the L1 third interfaces c of the first lower-level optical interconnection module 21 by using a second interface b (the 1st second interface from left to right) in the N1 second interfaces b.

Figure 1C:
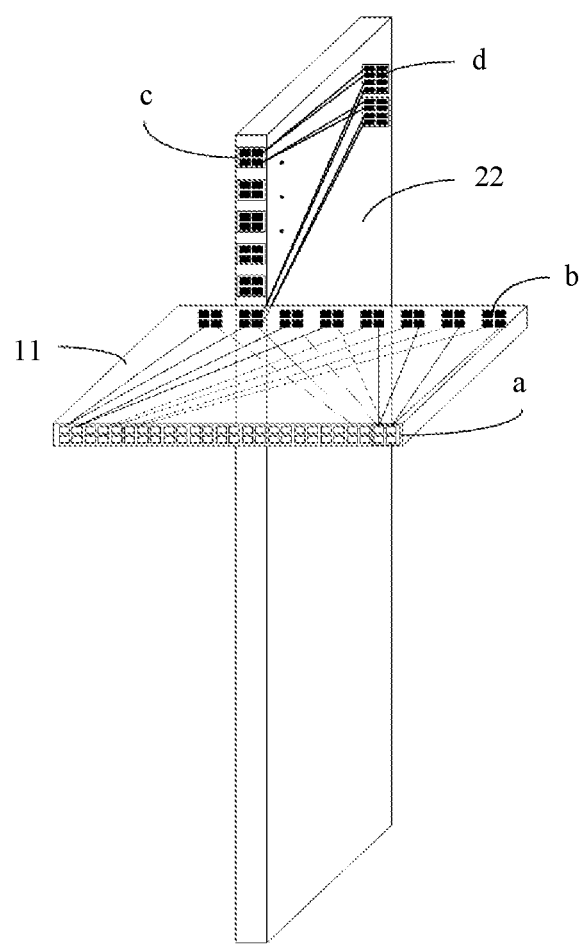

FIG. 1c is a schematic structural diagram of a connection between the first upper-level optical interconnection module and the second lower-level optical interconnection module. As shown in FIG. 1c, the second lower-level optical interconnection module 22 includes L2 third interfaces c and K2 fourth interfaces d, and there are connection relationships between the L2 third interfaces c and the K2 fourth interfaces d. The first upper-level optical interconnection module 11 is connected to a third interface c (namely, the 6$^{th}$ third interface from top to bottom) in the L2 third interfaces c of the second lower-level optical interconnection module 22 by using another second interface b (the 2$^{nd}$ second interface from left to right) in the N1 second interfaces b. All the M1 first interfaces a, the K1 fourth interfaces d, and the K2 fourth interfaces d are configured to connect to processing modules. All M1, N1, K1, K2, L1, and L2 are integers greater than 1.

It should be noted that in FIG. 1b and FIG. 1c, the first upper-level optical interconnection module 11 is the 6$^{th}$ upper-level optical interconnection module (from top to bottom) in FIG. 1a, the first lower-level optical interconnection module 21 is the 1st lower-level optical interconnection module in FIG. 1a, and the second lower-level optical interconnection module is the 2$^{nd}$ lower-level optical interconnection module in FIG. 1a. Manners of connections between the first upper-level optical interconnection module and both the first lower-level optical interconnection module and the second lower-level optical interconnection module are applicable to any upper-level optical interconnection module and any lower-level optical interconnection module in FIG. 1a, and a difference merely lies in that positions of second interfaces and third interfaces used for connection are different. Certainly, the first upper-level optical interconnection module 11 may be alternatively any other upper-level optical interconnection module in FIG. 1a, and the first lower-level optical interconnection module and the second lower-level optical interconnection module may be alternatively any two lower-level optical interconnection modules in FIG. 1a.

In addition, quantities of the upper-level optical interconnection modules and the lower-level optical interconnection modules in the optical backplane system shown in FIG. 1a are merely examples, and are not used as a limitation to this application provided that there are at least one upper-level optical interconnection module and at least two lower-level optical interconnection modules. All quantities of interfaces in FIG. 1b and FIG. 1c are examples, and may be set based on an actual requirement.

In this embodiment of the present invention, the optical backplane system is disposed by connecting an upper-level optical interconnection module and lower-level optical interconnection modules, so that when the system needs to be upgraded, only the lower-level optical interconnection modules need to be replaced one by one, and when a lower-level optical interconnection module is replaced, no impact is caused to a service carried on another lower-level optical interconnection module, thereby avoiding a problem that all services of the entire optical backplane system need to be interrupted.

The processing module includes but is not limited to a line processing unit (LPU), a switch fabric unit (SFU), an access & convergence unit (ACU), a coding & decoding unit (CDU), a deep packet inspection unit (DPIU), and a service awareness unit (SAU). For example, a first interface is connected to an LPU, and a fourth interface is connected to an SFU.

The first interface may be connected to a processing module by using an optical waveguide, for example, connected by using a fiber or a polymer optical waveguide. Similarly, the fourth interface may also be connected to a processing module by using an optical waveguide, for example, connected by using a fiber or a polymer optical waveguide. Connections using optical waveguides can enable the processing modules and the optical backplane system to be disposed separately, for example, the processing modules and the optical backplane system are disposed in different cabinets, so that the processing modules and the optical backplane system can be connected based on an actual scenario requirement, and application can be more flexible.

The first upper-level optical interconnection module includes a plurality of first optical channel sets, each first optical channel set includes N1 groups of first optical channels, the N1 groups of first optical channels are connected to the N1 second interfaces in a one-to-one correspondence, and each first optical channel set is connected to at least one of the M1 first interfaces. Each group of first optical channels includes at least one optical channel, and different groups of first optical channels in a same first optical channel set may include a same quantity of first optical channels. The first interfaces and the second interfaces of the first upper-level optical interconnection module may be connected in the following manners. The following provides descriptions with reference to FIG. 2a and FIG. 2b.

Figure 2A:
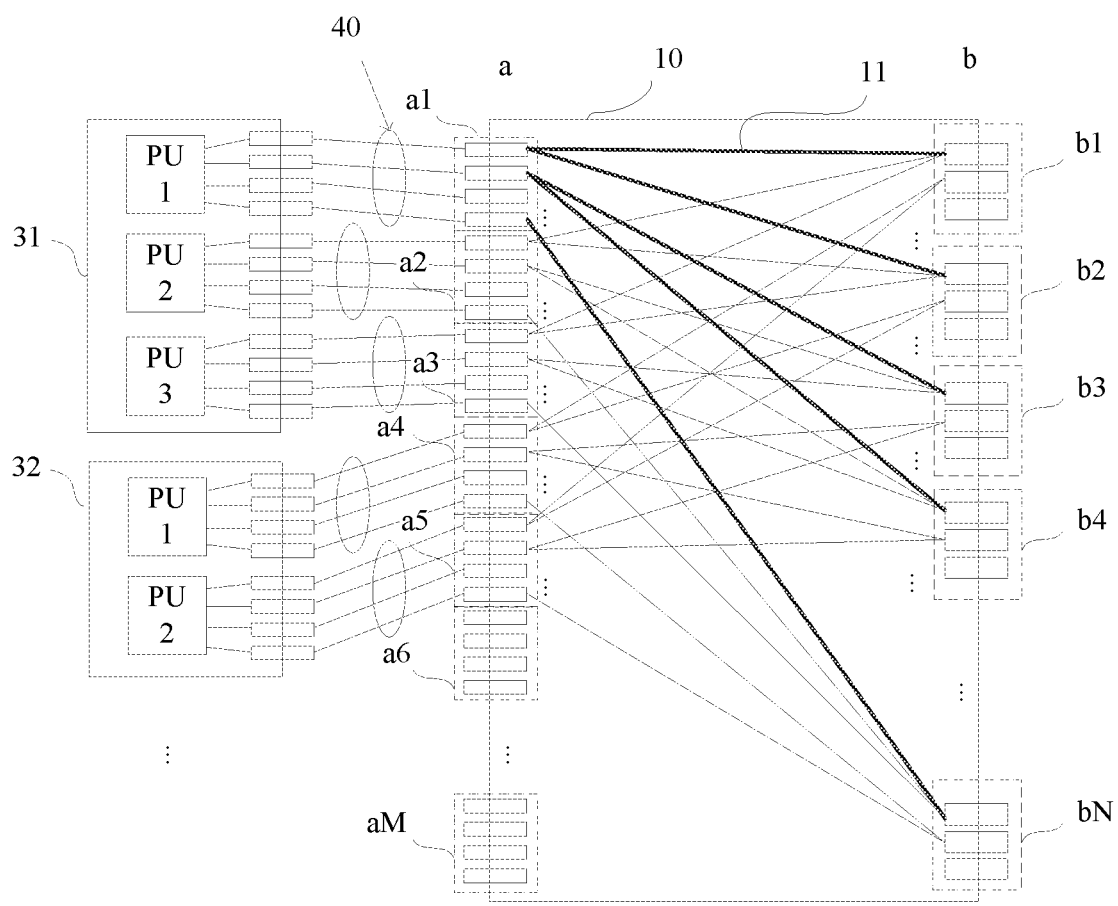
FIG. 2a and FIG. 2b each are a schematic structural diagram of connections between an upper-level optical interconnection module and processing modules according to an embodiment of the present invention.

In an implementation of this embodiment of the present invention, there is a first optical channel connected between any first interface and any second interface. The upper-level optical interconnection module includes a plurality of first optical channel sets, and each first optical channel set is connected to one of the M1 first interfaces. For example, as shown in FIG. 2a, first optical channels 11 connected to the Pt first interface a1 form one first optical channel set (shown by heavy solid lines in FIG. 2a), first optical channels 11 connected to the 2nd first interface a2 also form one first optical channel set, and so on. Each first optical channel set includes N1 groups of first optical channels, and the N1 groups of first optical channels are connected to the N1 second interfaces in a one-to-one correspondence.

That the N1 groups of first optical channels are connected to the N1 second interfaces in a one-to-one correspondence means that each group of first optical channels is connected to one second interface, and different groups of first optical channels are connected to different second interfaces. For example, it is assumed that there are three groups of first optical channels and three second interfaces, the three groups of first optical channels are respectively a first group of first optical channels, a second group of first optical channels, and a third group of first optical channels, the three second interfaces are respectively a $1^{st}$ second interface, a $2^{nd}$ second interface, and a $3^{rd}$ second interface, the first group of first optical channels is connected to the $1^{st}$ second interface, the second group of first optical channels is connected to the $2^{nd}$ second interface, and the third group of first optical channels is connected to the $3^{rd}$ second interface. For example, in FIG. 2a, the first optical channel set including the first optical channels 11 connected to the $1^{st}$ first interface a1 includes first optical channels respectively connected to second interfaces b1 to bN, as shown by the heavy solid lines in FIG. 2a.

In this embodiment of the present invention, each first interface may be configured to correspond to one processing unit (for example, a processing chip), that is, transmit (including receiving and sending) signals of one processing unit. For example, in FIG. 2a, the $1^{st}$ first interface a1 is connected to a processing unit PU1 of a processing module 31, the $2^{nd}$ first interface a2 is connected to a processing unit PU2 of the processing module 31, a $3^{rd}$ first interface a3 is connected to a processing unit PU3 of the processing module 31, a 4th first interface a4 is connected to a processing unit PU1 of a processing module 32, and a $5^{th}$ first interface a5 is connected to a processing unit PU2 of the processing module 32. Each first interface may be connected to one processing unit by using one fiber. For example, the first interface a1 is connected to an interface of the processing unit PU1 by using a fiber 40 (an ellipse in the figure represents one fiber). Further, one first interface may be alternatively connected to one processing unit by using at least two fibers, or a plurality of first interfaces are connected to a plurality of processing units by using one fiber.

Figure 2B:
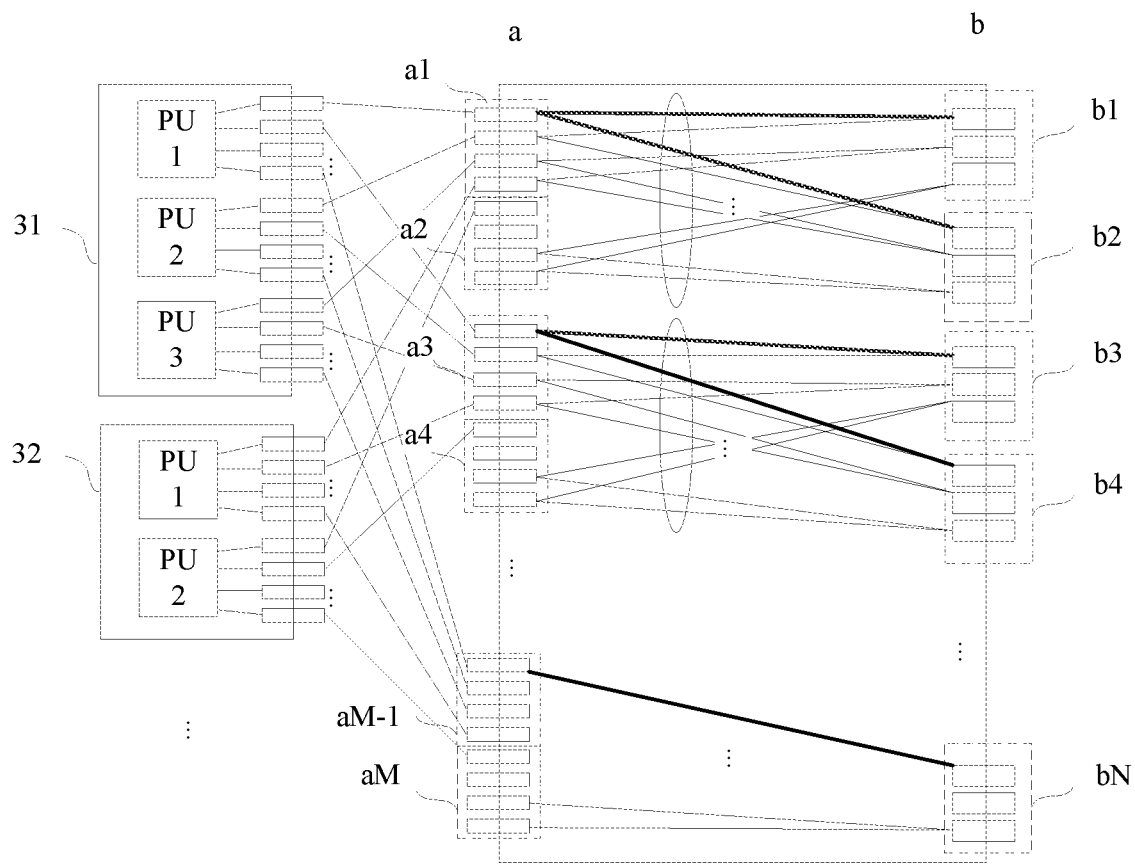
Figure 2C:
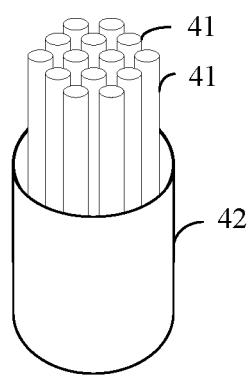
FIG. 2c and FIG. 2d each are a schematic structural diagram of a fiber according to an embodiment of the present invention.
Figure 2D:
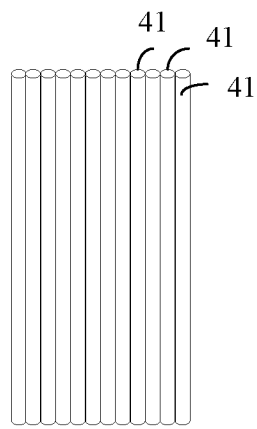

In this embodiment of the present invention, a fiber may be classified into an optical cable or a fiber ribbon based on different overall shapes. FIG. 2c and FIG. 2d are respectively schematic structural diagrams of an optical cable and a fiber ribbon. As shown in FIG. 2c, the optical cable includes a plurality of fibers 41 that are arranged into a round and a fiber jacket 42 wrapping the plurality of fibers. As shown in FIG. 2d, the fiber ribbon includes a plurality of fibers 41 that are arranged in a line.

Figure 2E:
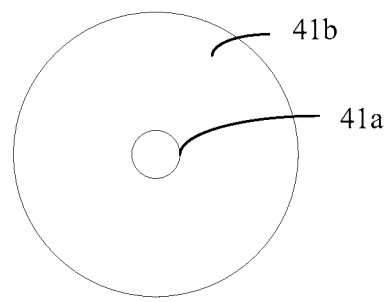
FIG. 2e and FIG. 2f are respectively schematic cross-sectional structural diagrams of a single-core fiber and a multi-core fiber.
Figure 2F:
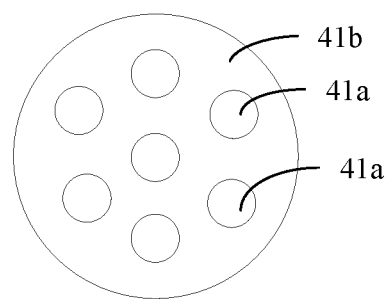

In this embodiment of the present invention, one fiber may include at least one wire, and a diameter of each wire is usually 125 µm. With reference to FIG. 2e and FIG. 2f, each wire includes at least one core 41a and a cladding 41b wrapping the at least one core 41a. In other words, each wire may be a single-core fiber (as shown in FIG. 2e) or a multi-core fiber (as shown in FIG. 2f). A diameter of a core usually includes 9 µm (single-mode), 50 µm (multi-mode), and 62.5 µm (multi-mode). A multi-core fiber is referred to as an MCF (Multi Core Fiber) in the industry, and a common core of a multi-core fiber is usually a single-mode core.

Each core of each wire is one optical channel. A most common fiber is a single-core fiber, and has one optical channel, that is, one channel of light (light of one wavelength or a plurality of wavelengths is combined into one channel of light) may be transmitted. A multi-core fiber has a plurality of optical channels.

In this case, a corresponding quantity of first interfaces may be selected and connected to each processing module based on a quantity of processing units and/or a scale of a processing unit (for example, a quantity of transceivers of the processing unit) of the processing module, so that implementation is convenient, and a case in which a processing module occupies an extra first interface and first optical channel does not exist, thereby avoiding a problem of a waste of a bus resource of the optical backplane system.

In another implementation of this embodiment of the present invention, the upper-level optical interconnection module includes a plurality of first optical channel sets, each first optical channel set includes N1 groups of first optical channels, the N1 groups of first optical channels are connected to the N1 second interfaces in a one-to-one correspondence, and each first optical channel set is connected to at least two of the M1 first interfaces. For example, as shown in FIG. 2b, heavy solid lines in the figure represent one first optical channel set. As described above, one processing module usually includes a plurality of processing units, and one first optical channel set may be configured to transmit a signal of one processing unit. The first optical channel set is connected to a plurality of first interfaces a1, a3, . . . , aM−1, and the first interfaces connected to the first optical channel set are distributed on different regions of a first panel. The second interfaces are also distributed based on regions in correspondence to the first interfaces, and a first interface and a second interface on a corresponding region are connected by using first optical channels. For example, in FIG. 2b, a first interface a1 and a first interface a2 are located on a same region, a second interface b1 and a second interface b2 are located on a same region, the first interface a1 is connected to the second interface b1 and the second interface b2, and the first interface a2 is connected to the second interface b1 and the second interface b2. Such connection manner can simplify arrangement of the first optical channels in the upper-level optical interconnection module.

Correspondingly, interfaces corresponding to one processing unit need to be connected to the plurality of first interfaces. For example, in FIG. 2b, a processing unit PU1 of a processing module 31 needs to be connected to a plurality of first interfaces a1, a3, . . . , aM−1. In this case, the interfaces corresponding to the processing unit may be connected to the plurality of first interfaces by using a bifurcated fiber.

Figure 2G:
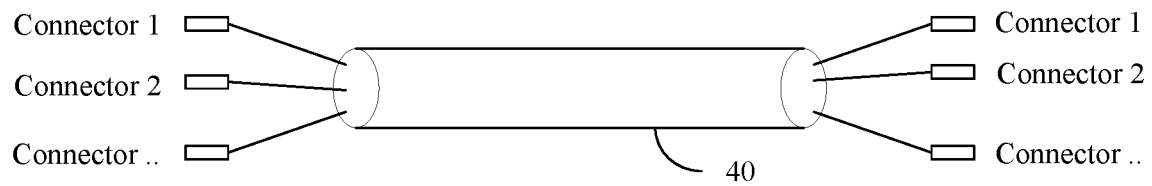
FIG. 2g is a schematic structural diagram of a bifurcated fiber according to an embodiment of the present invention.

As described above, one fiber may include a plurality of wires. For the fibers shown in FIG. 2c and FIG. 2d, the plurality of wires of the fiber may be directly dispersed, and connected to different fiber interfaces, to obtain a bifurcated fiber. FIG. 2g is a schematic structural diagram of a bifurcated fiber. As shown in FIG. 2g, one bifurcated fiber 40 includes a plurality of fibers, each fiber is a one-wire fiber or a multi-wire fiber, and two ends of each fiber are separately connected to one connector, the connector at one end is connected to a line processing module, and the connector at the other end is connected to an upper-level optical interconnection module. For example, two ends of a first fiber are connected to connectors 1, two ends of a second fiber are connected to connectors 2, and so on. Processing modules are connected to the upper-level optical interconnection module shown in FIG. 2b by using a bifurcated fiber, so that implementation is relatively convenient.

It should be noted that connection relationships between first interfaces and second interfaces of an upper-level optical interconnection module in this embodiment of the present invention are not limited to the connection relationships shown in FIG. 2a and FIG. 2b. For example, in another embodiment, when each first optical channel set is connected to Y first interfaces in the M first interfaces and first optical channels correspondingly connected to the Y first interfaces form Y first optical channel sets, a first optical channel set needed by a same processing module may be connected to the Y first interfaces, so that after the processing module is connected to the Y first interfaces, processing units of the processing module can be respectively connected to second interfaces of an upper-level optical interconnection module, and are further connected to another processing module, for example, a switching module, by using a lower-level optical interconnection module connected to the second interfaces. For another example, all first optical channels in at least two first optical channel sets may be alternatively connected to a same first interface, and then a single first interface is connected to different processing units (which may be processing units of a same processing module or processing units of different processing modules) by using a bifurcated fiber.

According to the connection relationships between the first interfaces and the second interfaces of the upper-level optical interconnection module, in the foregoing upper-level optical interconnection module, each processing unit can be connected to each second interface of the upper-level optical interconnection module. Because each second interface is connected to one lower-level optical interconnection module, each processing unit can be connected to the lower-level optical interconnection module by using the upper-level optical interconnection module.

A first optical channel is a channel used to transmit an optical signal, and may be a fiber, a polymer optical waveguide, or the like. In this embodiment, one first optical channel is configured to transmit one optical signal. For example, one first optical channel is needed to transmit a signal between one receiver and one transmitter, and one receiver and one transmitter form one transceiver. In a case of non-multiplexing, two first optical channels are needed to transmit a signal between two transceivers. Certainly, this embodiment of the present invention is also applicable to a case of multiplexing. In other words, one first optical channel is needed to transmit a signal between one transceiver and another transceiver.

In this embodiment of the present invention, each first interface may include one or more optical connectors. The second interface may also include one or more optical connectors. For example, in FIG. 2a and FIG. 2b, each rectangle represents one optical connector, one first interface a that includes four optical connectors, and one second interface b that includes four optical connectors. During implementation, a plurality of optical connectors of a same interface may be assembled into one entity connector, to facilitate assembly, or certainly, may be a plurality of independent optical connectors. When each optical connector corresponds to a particular quantity of optical channels, a quantity of optical connectors of each first interface may be set according to a quantity of optical channels needed by one processing unit. For example, if one processing unit has 48 transceivers, each transceiver corresponds to two optical channels, and each optical connector has 48 optical channels, a first interface corresponding to one processing unit needs to include two optical connectors.

Further, a quantity of first optical channels connected to a single second interface may be greater than or equal to a quantity of first optical channels connected to a single first interface. Therefore, there may be the following configurations: a quantity of optical channels connected to a single optical connector of the first interface is equal to a quantity of optical channels connected to a single optical connector of the second interface, and a quantity of optical connectors of the second interface is equal to a quantity of optical connectors of the first interface; or a quantity of optical channels connected to a single optical connector of the first interface is equal to a quantity of optical channels connected to a single optical connector of the second interface, and a quantity of optical connectors of the second interface is greater than a quantity of optical connectors of the first interface; or the second interface and the first interface include a same quantity of optical connectors, but a single optical connector of the second interface is connected to a larger quantity of optical channels; or a quantity of optical connectors of the second interface is greater than a quantity of optical connectors of the first interface, and a single optical connector of the second interface is connected to a larger quantity of optical channels. In addition, when there are a relatively large quantity of lower-level optical interconnection modules, there may be a case in which a quantity of first optical channels connected to a single second interface is less than a quantity of first optical channels connected to a single first interface.

In this embodiment of the present invention, a type of an optical connector includes but is not limited to a multiple-fiber push-on/push-off (MPO) connector and a compact conjoined lucent connector (LC).

In this embodiment of the present invention, an upper-level optical interconnection module may include a bearer (used for disposing a first optical channel), and a first panel and a second panel that are oppositely disposed on a bearing plate. The first interfaces may be disposed on the first panel, and the second interfaces may be disposed on the second panel. Further, the upper-level optical interconnection module may be of a box-shaped structure, or may be of a plate-shaped structure.

Figure 3A:
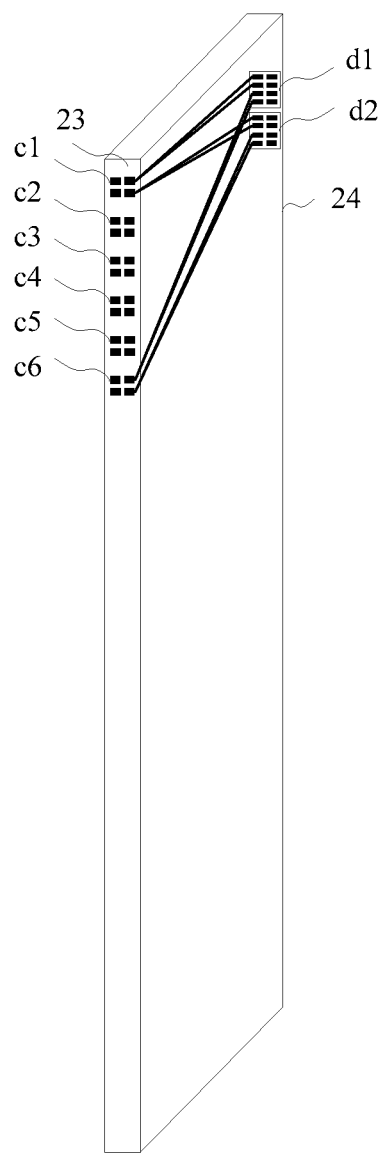
FIG. 3a and FIG. 3b each are a schematic structural diagram of a lower-level optical interconnection module according to an embodiment of the present invention.

FIG. 3a is a schematic structural diagram of a lower-level optical interconnection module according to an embodiment of the present invention. The lower-level optical interconnection module shown in FIG. 3a is configured to implement single-level switching. As shown in FIG. 3a, the lower-level optical interconnection module includes L second optical channel sets, the L second optical channel sets are connected to the L third interfaces c in a one-to-one correspondence. For example, a $1^{st}$ third interface c1 is connected to a $1^{st}$ second optical channel set. Each second optical channel set includes a plurality of groups of second optical channels, and each group of second optical channels in the L second optical channel sets is correspondingly connected to one of K fourth interfaces d. In addition, each of the L second optical channel sets includes K groups of second optical channels. In other words, there are second optical channels connected between any third interface and any fourth interface. For example, the Pt third interface c1 is connected to the Pt fourth interface d1 by using one group of second optical channels in the $1^{st}$ second optical channel set, and is connected to the $2^{nd}$ fourth interface d2 by using another group of second optical channels in the $1^{st}$ second optical channel set.

It should be noted that in the embodiment shown in FIG. 3a, L=6, and K=2. In other words, there are six third interfaces, namely, c1, c2, . . . , c6, and there are two fourth interfaces, namely, d1 and d2. Certainly, quantities of the third interfaces and the fourth interfaces in FIG. 3a are merely examples, and are not used as a limitation to this embodiment of the present invention.

Figure 3B:
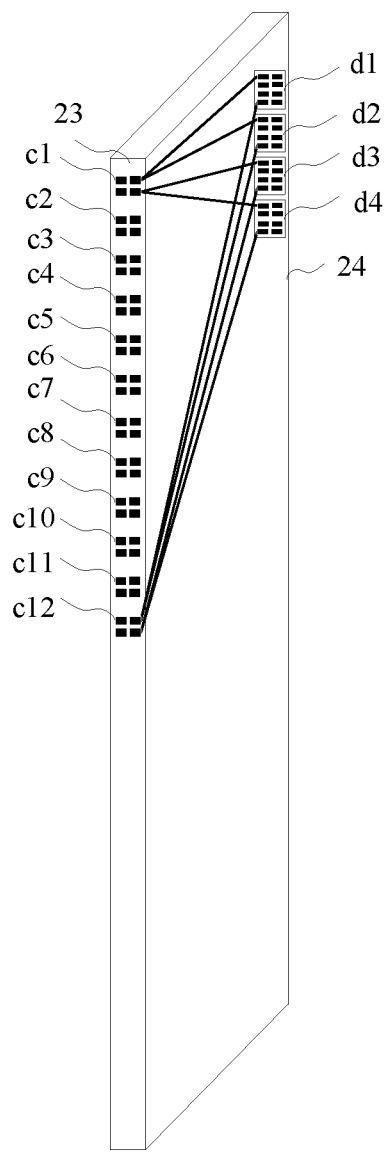

FIG. 3b is a schematic structural diagram of another lower-level optical interconnection module according to an embodiment of the present invention. The lower-level optical interconnection module shown in FIG. 3b is also configured to implement single-level switching. Connection relationships between third interfaces and fourth interfaces are the same as those in FIG. 3a, and a quantity of optical channels of a single third interface and a quantity of optical channels of a single fourth interface are also the same as those of the third interface and the fourth interface in FIG. 3a. A difference between FIG. 3b and FIG. 3a lies in that compared with the lower-level optical interconnection module shown in FIG. 3a, there are a larger quantity of third interfaces and a larger quantity of fourth interfaces in FIG. 3b, there are 12 third interfaces (c1, c2, . . . , c12), that is, L=12, and there are four fourth interfaces (d1, d2, d3, and d4), that is, K=4, so that there are more second optical channels connected between the third interfaces and the fourth interfaces, that is, the lower-level optical interconnection module shown in FIG. 3b has more bus resources.

In the lower-level optical interconnection modules shown in FIG. 3a and FIG. 3b, because there are second optical channels connected between any third interface and any fourth interface, when each processing unit of a processing module is connected to each lower-level optical interconnection module by using an upper-level optical interconnection module, each processing unit can find, by using a switching unit, another processing unit connected to the optical backplane system, and exchange data with the processing unit, that is, single-level switching is implemented.

Figure 4A:
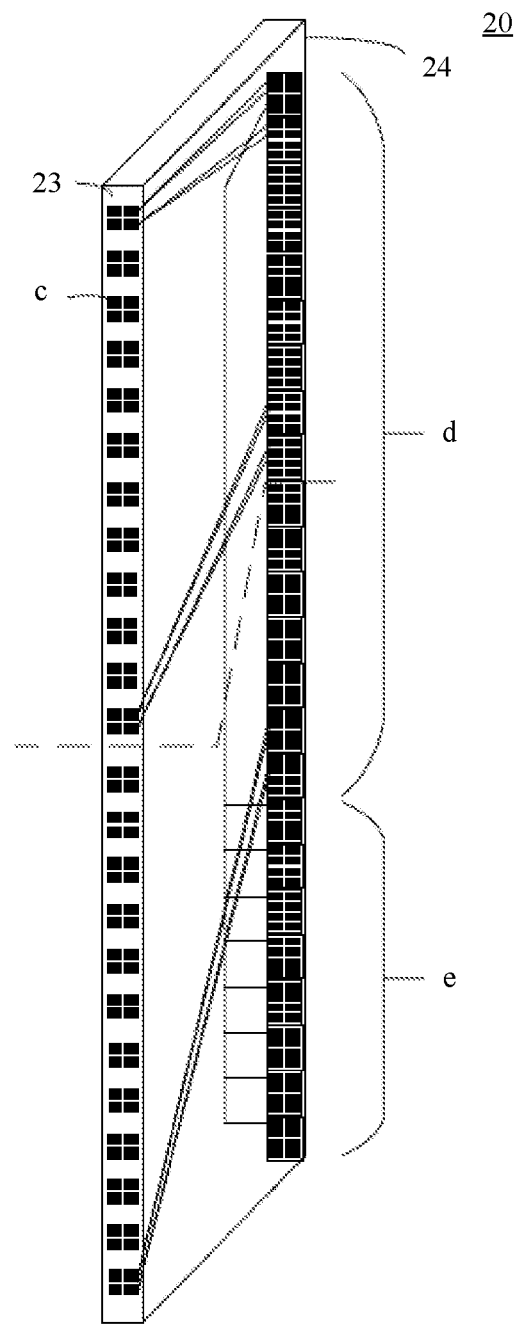
FIG. 4a is a schematic structural diagram of another lower-level optical interconnection module according to an embodiment of the present invention.

FIG. 4a is a schematic structural diagram of another lower-level optical interconnection module according to an embodiment of the present invention. As shown in FIG. 4a, the lower-level optical interconnection module includes L second optical channel sets, the L second optical channel sets are connected to the L third interfaces in a one-to-one correspondence, each second optical channel set includes a plurality of groups of second optical channels, and each group of second optical channels in the L second optical channel sets is correspondingly connected to one of the K fourth interfaces.

In FIG. 4a, the K fourth interfaces are grouped into two groups, the L third interfaces are also grouped into two groups, and different groups of fourth interfaces in the two groups of fourth interfaces are connected to corresponding groups of third interfaces. For example, in FIG. 4a, a first group of fourth interfaces d (fourth interfaces above a dashed line are a first group, and fourth interfaces below the dashed line are a second group) are connected to a first group of third interfaces c (third interfaces above the dashed line are a first group, and third interfaces below the dashed line are a second group), and there are second optical channels connected between each fourth interface in the first group of fourth interfaces and each third interface in the first group of third interfaces.

Further, the first lower-level optical interconnection module further includes a plurality of fifth interfaces e, and the fourth interfaces in the two groups of fourth interfaces are connected to each other by using the fifth interfaces e of the first lower-level optical interconnection module. In the lower-level optical interconnection module shown in FIG. 4a, each fifth interface e is connected to each fourth interface d.

Figure 4B:
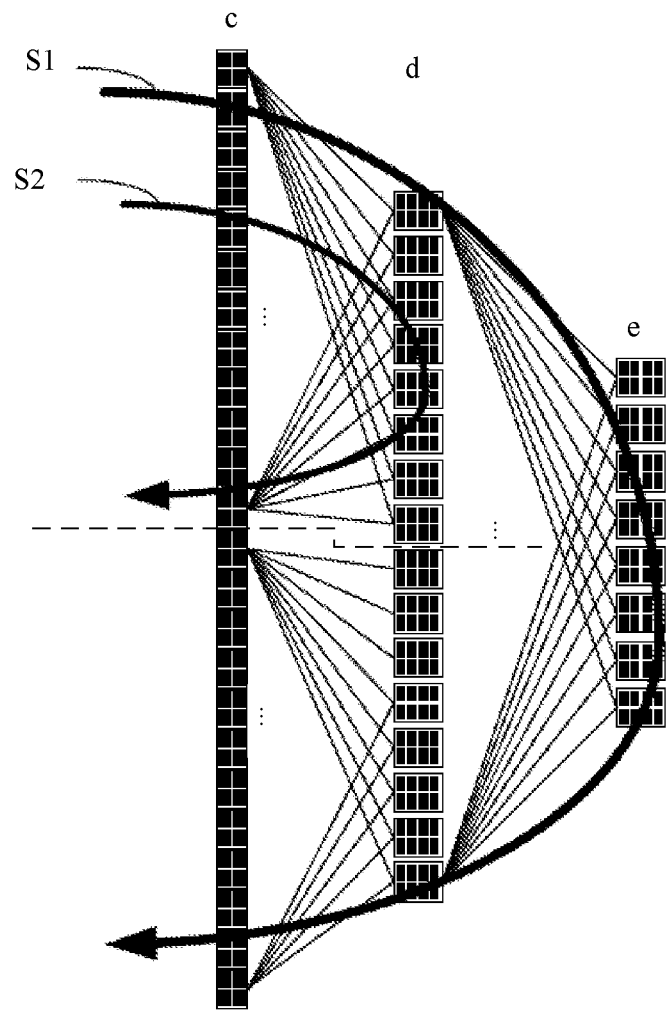

FIG. 4b is a schematic diagram of signal transmission of the lower-level optical interconnection module shown in FIG. 4a. As shown in FIG. 4b, when third interfaces in different groups need to exchange data, a signal from an upper-level optical interconnection module is transmitted from a third interface c in the first group to a switching unit (not shown in the figure) connected to a fourth interface d in the first group, then sequentially passes through a switching unit connected to the fifth interfaces e and a switching unit connected to a fourth interface d in the second group, and finally is sent to the upper-level optical interconnection module from a third interface c in the second group, and a path is shown by an arrow S1 in FIG. 4b. The signal passes through three switching units in the entire process, and in this case, it is three-level switching. When third interfaces c in a same group need to exchange data, a signal from an upper-level optical interconnection module is transmitted from a third interface c in the first group to a switching unit connected to a fourth interface d in the first group, and then arrives at another third interface c in the first group. The signal passes through only one switching unit in the entire process, and in this case, it is single-level switching, and a path is shown by an arrow S2 in FIG. 4b.

In the embodiment shown in FIG. 3a and FIG. 3b and the embodiment shown in FIG. 4a and FIG. 4b, each group of second optical channels includes a plurality of second optical channels. A second optical channel is a channel used to transmit an optical signal, and may be a fiber, a polymer optical waveguide, or the like. In this embodiment, one second optical channel is configured to transmit one optical signal.

It should be noted that the structure of the lower-level optical interconnection module is described by using single-level switching as an example in FIG. 3a and FIG. 3b, and the structure of the lower-level optical interconnection module is described by using three-level switching as an example in FIG. 4a and FIG. 4b. In another embodiment, a back-to-back (also referred to as two-level switching) form or a form of switching of more levels may be alternatively used.

In back-to-back switching, different groups of fourth interfaces in the two groups of fourth interfaces are directly connected by using optical channels. In multi-level switching, the fifth interfaces are grouped into at least two levels. Grouping is performed for fifth interfaces at each level other than fifth interfaces at the last level, and a quantity of groups of fifth interfaces decreases level by level from the first level of fifth interfaces to the last level of fifth interfaces. The fifth interfaces at the first level are connected to the fourth interfaces, fifth interfaces at a current level are connected to fifth interfaces at a previous level, the fifth interfaces at the last level are respectively connected to fifth interfaces at the last but one level, and one group of fifth interfaces in fifth interfaces at a current level are connected to at least two groups of fifth interfaces in fifth interfaces at a previous level, so that switching of more than three levels can be implemented by connecting different groups of fourth interfaces by using the plurality of levels of fifth interfaces.

In this embodiment of the present invention, each third interface may include one or more optical connectors, and the optical connector of the third interface is disposed in correspondence to an optical connector of a second interface. In other words, quantities of the optical connectors are the same, and the optical connectors are connected to a same quantity of optical channels. The fourth interface may also include one or more optical connectors. A type of an optical connector includes but is not limited to an MPO connector and a compact conjoined LC connector.

Further, a quantity of second optical channels connected to a single fourth interface may be greater than or equal to a quantity of second optical channels connected to a single third interface. Therefore, there may be the following configurations: a quantity of optical channels connected to a single optical connector of the third interface is equal to a quantity of optical channels connected to a single optical connector of the fourth interface, and a quantity of optical connectors of the fourth interface is equal to a quantity of optical connectors of the third interface; or a quantity of optical channels connected to a single optical connector of the fourth interface is equal to a quantity of optical channels connected to a single optical connector of the third interface, and a quantity of optical connectors of the fourth interface is greater than a quantity of optical connectors of the third interface; or the third interface and the fourth interface include a same quantity of optical connectors, but a single optical connector of the fourth interface is connected to a larger quantity of optical channels; or a quantity of optical connectors of the fourth interface is greater than a quantity of optical connectors of the third interface, and a single optical connector of the fourth interface is connected to a larger quantity of optical channels. In addition, when a switching module includes a relatively small quantity of optical channels, there may be a case in which a quantity of second optical channels connected to a single fourth interface is less than a quantity of second optical channels connected to a single third interface.

In an implementation of the optical backplane system shown in FIG. 1a, L1=L2, that is, the first lower-level optical interconnection module and the second lower-level optical interconnection module have a same quantity of third interfaces. For example, the first lower-level optical interconnection module and the second lower-level optical interconnection module each are the lower-level optical interconnection module shown in FIG. 3a or the lower-level optical interconnection module shown in FIG. 3b, or the first lower-level optical interconnection module and the second lower-level optical interconnection module each are the lower-level optical interconnection module shown in FIG. 4a and have a same quantity of third interfaces.

In another implementation of the optical backplane system shown in FIG. 1a, L1 L2, that is, the first lower-level optical interconnection module and the second lower-level optical interconnection module have different quantities of third interfaces. When L1 L2, the first lower-level optical interconnection module and the second lower-level optical interconnection module may be connected to different quantities of upper-level optical interconnection modules. For example, one of the first lower-level optical interconnection module and the second lower-level optical interconnection module is the lower-level optical interconnection module shown in FIG. 3a, and the other is the lower-level optical interconnection module shown in FIG. 3b. Alternatively, for another example, one of the first lower-level optical interconnection module and the second lower-level optical interconnection module is the lower-level optical interconnection module shown in FIG. 3a or FIG. 3b, and the other is the lower-level optical interconnection module shown in FIG. 4a. It should be noted that L1≠L2 occurs mostly in a system upgrade process.

In the lower-level optical interconnection modules shown in FIG. 3a, FIG. 3b, and FIG. 4a, the lower-level optical interconnection modules each include a first panel 23 and a second panel 24 that are oppositely disposed, the third interfaces c are located on the first panel 23, and the fourth interfaces d are located on the second panel 24. In the lower-level optical interconnection module shown in FIG. 4a, the fifth interfaces e are also located on the second panel 24.

In the embodiment shown in FIG. 1a, the optical backplane system may further include a second upper-level optical interconnection module. The second upper-level optical interconnection module is any upper-level optical interconnection module other than the first upper-level optical interconnection module. The second upper-level optical interconnection module includes M2 first interfaces and N2 second interfaces, and there are connection relationships between the M2 first interfaces and the N2 second interfaces. The second upper-level optical interconnection module is connected to one of the L1 third interfaces of the first lower-level optical interconnection module by using one of the N2 second interfaces. The second upper-level optical interconnection module is connected to one of the L2 third interfaces of the second lower-level optical interconnection module by using another one of the N2 second interfaces. The M2 first interfaces are configured to connect to processing modules, where both M2 and N2 are integers greater than 1.

The quantity of the first interfaces of the second upper-level optical interconnection module may be same as the quantity of the first interfaces of the first upper-level optical interconnection module, that is, M2 may be equal to M1, or the quantities may be unequal, that is, M2 is unequal to M1.

In the embodiment shown in FIG. 1a, the second interfaces of the upper-level optical interconnection module and the third interfaces of the lower-level optical interconnection module are directly connected (that is, are in plug connection by using optical connectors) or are connected by using adapters. Further, the upper-level optical interconnection module and the lower-level optical interconnection module may be disposed in an orthogonal manner, to facilitate assembly.

Figure 5A:
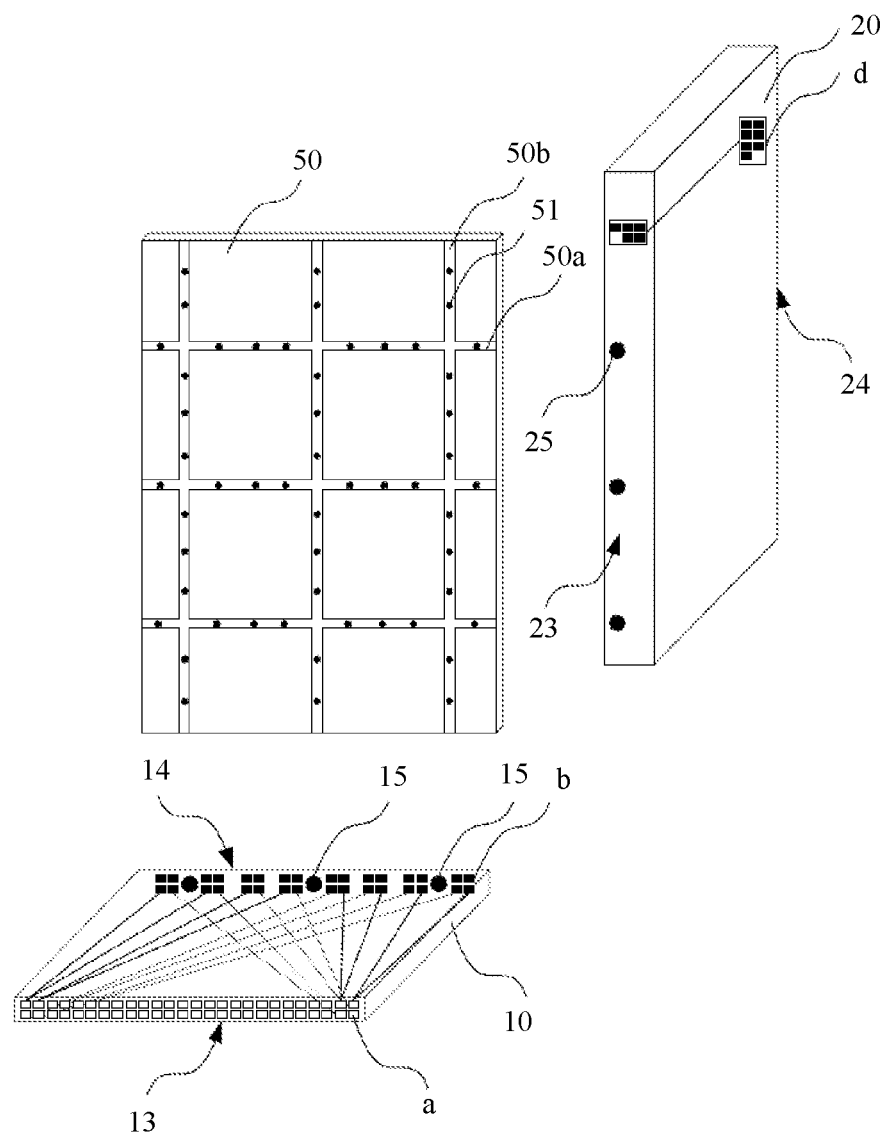
FIG. 5a is a schematic exploded structural diagram of another optical backplane system according to an embodiment of the present invention.
Figure 5B:
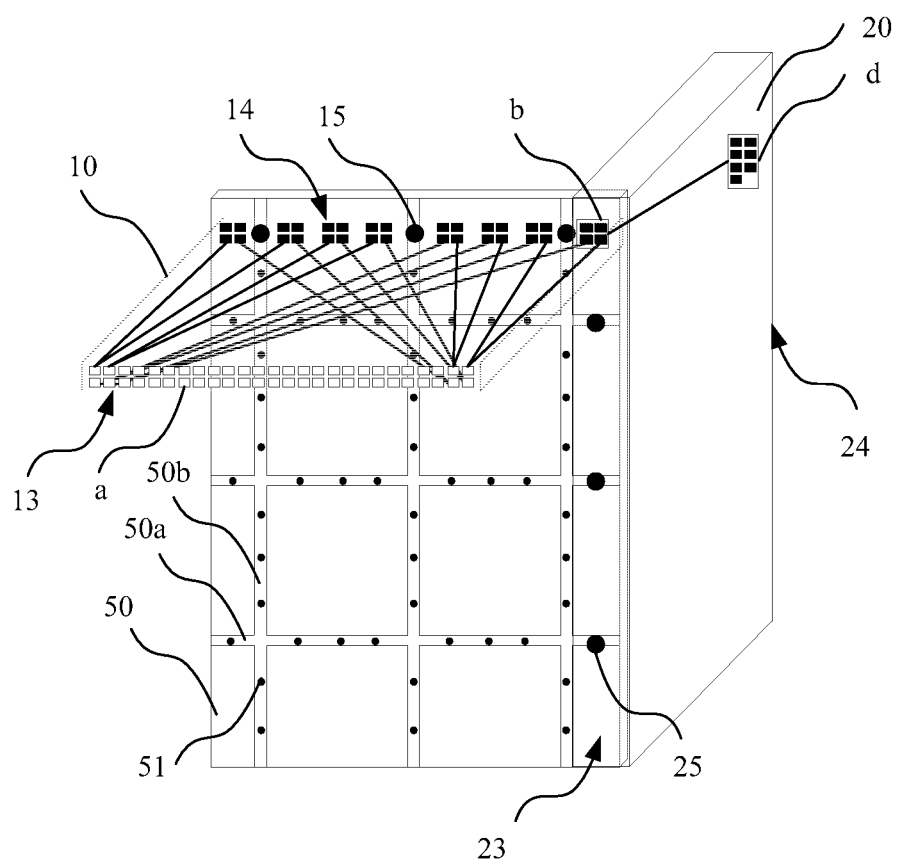

For the convenience of plug connection, the optical backplane system may further include a positioning and guiding apparatus. FIG. 5a and FIG. 5b show an optical backplane system having a positioning and guiding apparatus. FIG. 5a is a schematic exploded structural diagram of the optical backplane system, and FIG. 5b is a schematic assembly structural diagram of the optical backplane system. As shown in FIG. 5a, the optical backplane system includes an upper-level optical interconnection module 10, a lower-level optical interconnection module 20, and a positioning and guiding apparatus. In the embodiment shown in FIG. 5a and FIG. 5b, the positioning and guiding apparatus includes a positioning frame 50, guiding columns 51 are respectively disposed on two opposite side surfaces of the positioning frame 50, guiding slots 15 are disposed on the upper-level optical interconnection module 10, and guiding slots 25 are disposed on the lower-level optical interconnection module 20. The guiding slots 15 and the second interfaces b of the upper-level optical interconnection module 10 are located on a same panel (that is, a second panel 14), and the guiding slots 25 and the third interfaces c of the lower-level optical interconnection module 20 are located on a same panel (that is, the first panel 23).

The positioning frame 50 may be of a grid structure, and includes a plurality of horizontal bars 50a disposed in parallel and a plurality of vertical bars 50b perpendicular to the horizontal bars. All guiding columns 51 located on one side surface of the positioning frame 50 are disposed on the horizontal bars 50a, and are configured to fit the guiding slots 25 on the lower-level optical interconnection module 20. All guiding columns 51 located on the other side surface of the positioning frame 50 are disposed on the vertical bars 50b, and are configured to fit the guiding slots 15 on the upper-level optical interconnection module 10.

Figure 5C:
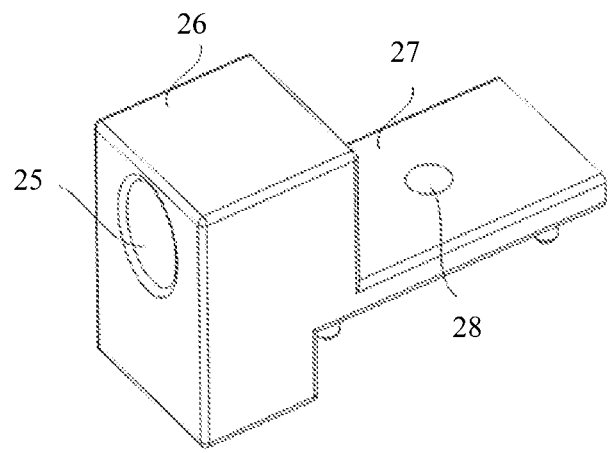
FIG. 5c is a schematic structural diagram of a guiding slot according to an embodiment of the present invention.

FIG. 5c is a schematic disposing structural diagram of a guiding slot according to an embodiment of the present invention. As shown in FIG. 5c, in this embodiment, the guiding slot 25 is disposed on a guiding slot seat 26, a connection plate 27 is disposed on one side of the guiding slot seat 16, a connection plate (not shown in the figure) perpendicular to the first panel 23 may also be correspondingly disposed on a side of the first panel 23, mounting holes 28 are correspondingly disposed on the two connection plates, and a fastening piece such as a bolt penetrates a correspondingly disposed mounting hole 28, to fasten the guiding slot seat 26 to the lower-level optical interconnection module 20. A structure of the guiding slot 15 and a mounting manner of the guiding slot 15 may be the same as the structure of the guiding slot 25, and details are not described herein again.

Figure 5D:
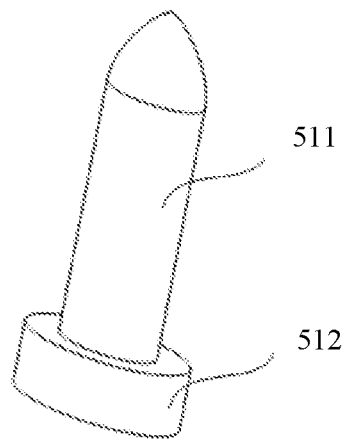
FIG. 5d is a schematic structural diagram of a guiding column according to an embodiment of the present invention.

FIG. 5d is a schematic structural diagram of a guiding column according to an embodiment of the present invention. As shown in FIG. 5d, the guiding column 51 in this embodiment includes a column body 511 and a limiting block disposed at one end of the column body. A plurality of through holes are disposed on the positioning frame 50. The guiding column 51 is inserted into and fastened to a through hole on the positioning frame 50, to fit the corresponding positioning slot for guiding and limiting. Certainly, in another embodiment, a protrusion structure may be directly formed on the positioning frame and used as a guiding column.

The structure of the positioning and guiding apparatus in FIG. 5a and FIG. 5b is merely an example, and this application is not limited thereto. A positioning and guiding apparatus of another structure may be alternatively used. For example, a guiding column may be disposed on the first upper-level optical interconnection module, and a guiding hole is correspondingly disposed on the lower-level optical interconnection module. When the upper-level optical interconnection module and lower-level optical interconnection module are connected, the guiding column is inserted into the guiding hole, to implement guiding, so that the second interface is aligned with the third interface, to reduce a possibility of damage. Certainly, positions of the guiding column and the guiding hole may be alternatively exchanged provided that a guiding function can be implemented.

Figure 6:
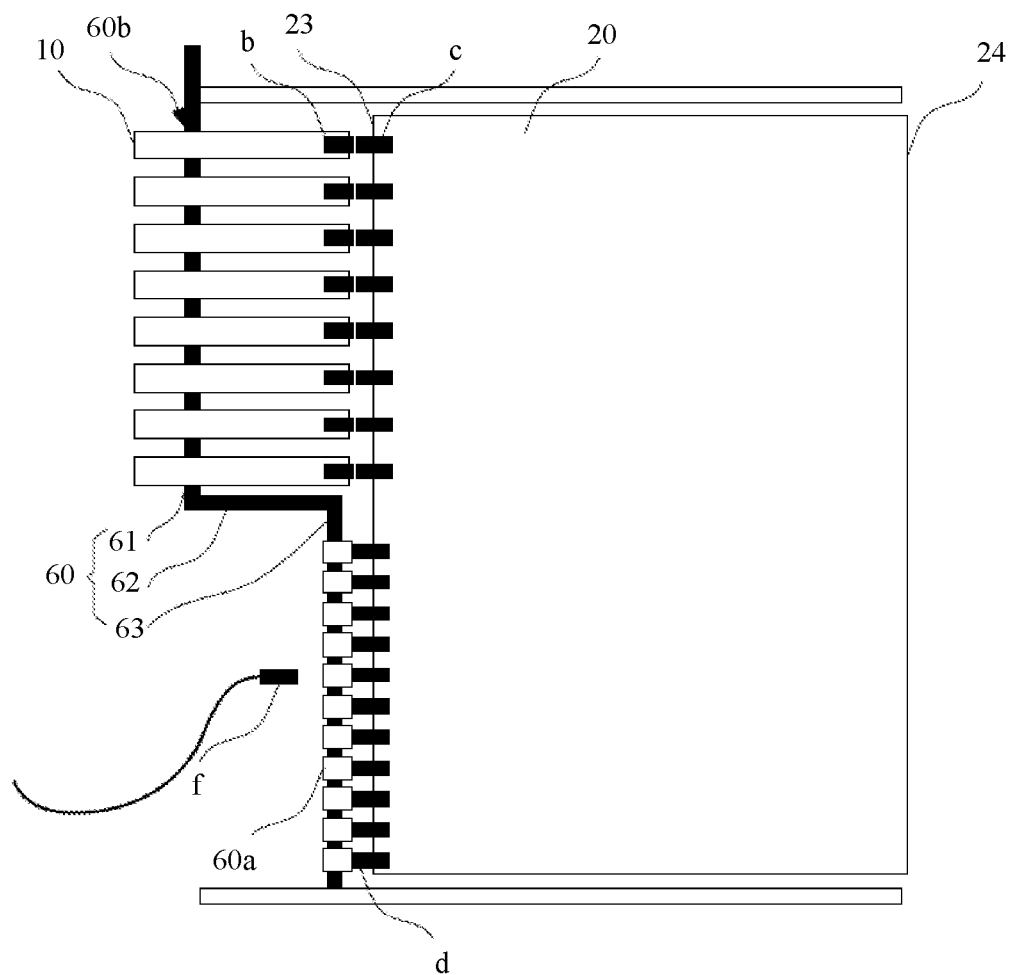
FIG. 6 is a schematic structural diagram of still another optical backplane system according to an embodiment of the present invention.
Figure 7:
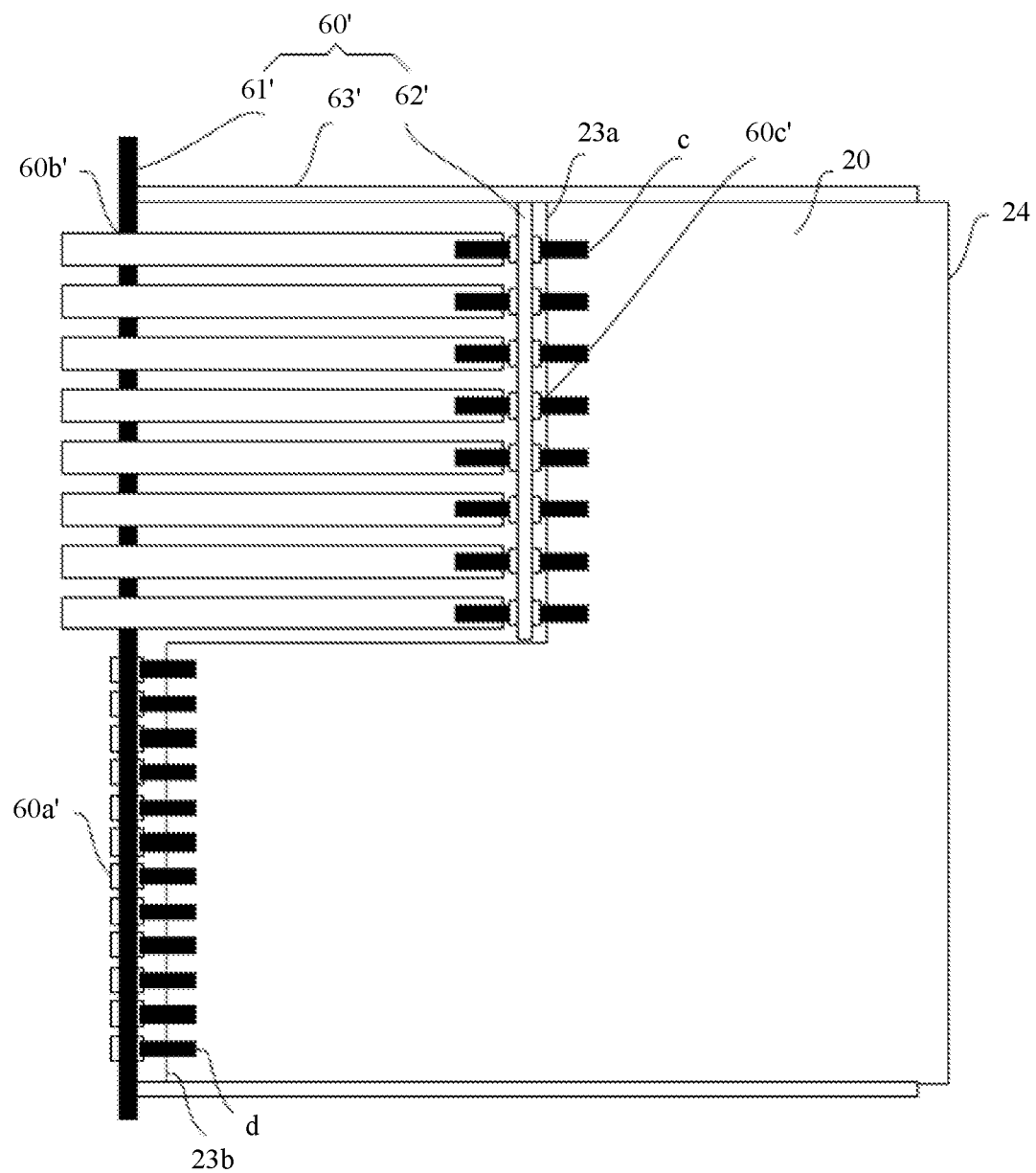
FIG. 7 is a schematic structural diagram of yet another optical backplane system according to an embodiment of the present invention.

FIG. 6 and FIG. 7 are schematic structural diagrams of another optical backplane system according to an embodiment of the present invention. As shown in FIG. 6 and FIG. 7, the optical backplane system includes upper-level optical interconnection modules 10 and lower-level optical interconnection modules 20. The upper-level optical interconnection module 10 may be of the structure shown in FIG. 2a or FIG. 2b. Connection relationships between third interfaces c and fourth interfaces d of the lower-level optical interconnection module 20 may be the same as the connection relationships between the third interfaces and the fourth interfaces of the lower-level optical interconnection module shown in FIG. 3a, FIG. 3b, or FIG. 4a, and a difference merely lies in that in FIG. 6 and FIG. 7, all the third interfaces c and the fourth interfaces d are located on a first panel 23.

In addition, in FIG. 6 and FIG. 7, the optical backplane system further includes a support frame 60, a plurality of interface fastening slots 60a are disposed on the support frame 60, and the fourth interfaces d disposed on the first panel 23 are disposed in the interface fastening slots 60a. When a lower-level optical interconnection module is replaced, all fiber interfaces f of processing modules connected to the fourth interfaces are disposed in the interface fastening slots 60a. Fourth interfaces of a new lower-level optical interconnection module may be connected to the fiber interfaces at a time without a need to re-arrange or re-connect fibers corresponding to the fourth interfaces, thereby simplifying an operation and greatly improving replacement efficiency.

It should be noted that in another embodiment, some of the fourth interfaces d may be located on the first panel 23, and the other may be located on a second panel 24.

In the embodiment shown in FIG. 6, the first panel 23 is a strip-shaped planar plate. The third interfaces c are located on a first region (for example, an upper region in FIG. 6) of the first panel 23, and the fourth interfaces d are located on another region (for example, a lower region in FIG. 6) of the first panel 23. In the embodiment shown in FIG. 7, the first panel 23 includes two parts on parallel planes, namely, a first part 23a and a second part 23b. The third interfaces c are disposed on the first part 23a, and the fourth interfaces d are disposed on the second part 23b.

Further, in the optical backplane system shown in FIG. 6, upper-level optical interconnection module support slots 60b are further disposed on the support frame, the upper-level optical interconnection module support slots 60b are located on an upper region of the support frame 60, and are arranged opposite to the third interfaces c. The plurality of interface fastening slots 60a are located on a lower region of the support frame 60, and are arranged opposite to the fourth interfaces d. The upper-level optical interconnection module support slots are disposed, so that a new lower-level optical interconnection module can be connected to both an upper-level optical interconnection module on a support plate and the fiber interfaces in the interface fastening slots, thereby further improving replacement efficiency.

In the embodiment shown in FIG. 6, the support frame 60 includes a first support plate 61, a second support plate 62, and a connection plate 63 connecting the first support plate 61 and the second support plate 62. The first support plate 61 and the second support plate 62 are located on different planes and are respectively located on two sides of the connection plate 63, the upper-level optical interconnection module support slots 60b are located on the first support plate 61, and the plurality of interface fastening slots 60a are located on the second support plate 62. The plane of the first support plate 61 is parallel to the plane of the second support plate 62, and the second support plate 62 is disposed closer to the lower-level optical interconnection module than the first support plate 61.

Because a size of an upper-level optical interconnection module is relatively large, after an upper-level optical interconnection module is placed into an upper-level optical interconnection module support slot, to ensure mounting stability of the upper-level optical interconnection module, the first support plate supports a middle part of the upper-level optical interconnection module. In this case, the upper-level optical interconnection module extends out of the first support plate. The first support plate and the second support plate are disposed on different planes, so that second interfaces of the upper-level optical interconnection module and the fiber interfaces in the interface fastening slots are located on a same plane, to facilitate alignment.

In the embodiment shown in FIG. 7, the support frame 60' includes a first support plate 61' and a second support plate 62' that are parallel to each other, upper-level optical interconnection module support slots 60b' are disposed on an upper region of the first support plate 61', interface fastening slots 60a' are disposed on a lower region of the first support plate 61', and interface fastening slots 60c' are disposed on the second support plate 62' in correspondence to the upper-level optical interconnection module support slots 60b'. In the embodiment shown in FIG. 7, the support frame 60' further includes a connection plate 63' connecting the first support plate 61' and the second support plate 62'.

In the embodiments shown in FIG. 1a, FIG. 6, and FIG. 7, all lower-level optical interconnection modules have a same shape and a same size regardless of a quantity of third interfaces. In this way, a same cabinet may be used, to facilitate placement and storage. Certainly, in another embodiment, when quantities of third interfaces are different, sizes of the lower-level optical interconnection modules may also be different.

In another implementation, the second interfaces of the upper-level optical interconnection module are connected to the third interfaces of the lower-level optical interconnection module by using polymer optical waveguides, fibers, or the like. Indirection connection can enable the upper-level optical interconnection module and the lower-level optical interconnection module to be disposed separately, for example, disposed in different cabinets, to meet more scenario requirements.

Figure 8A:
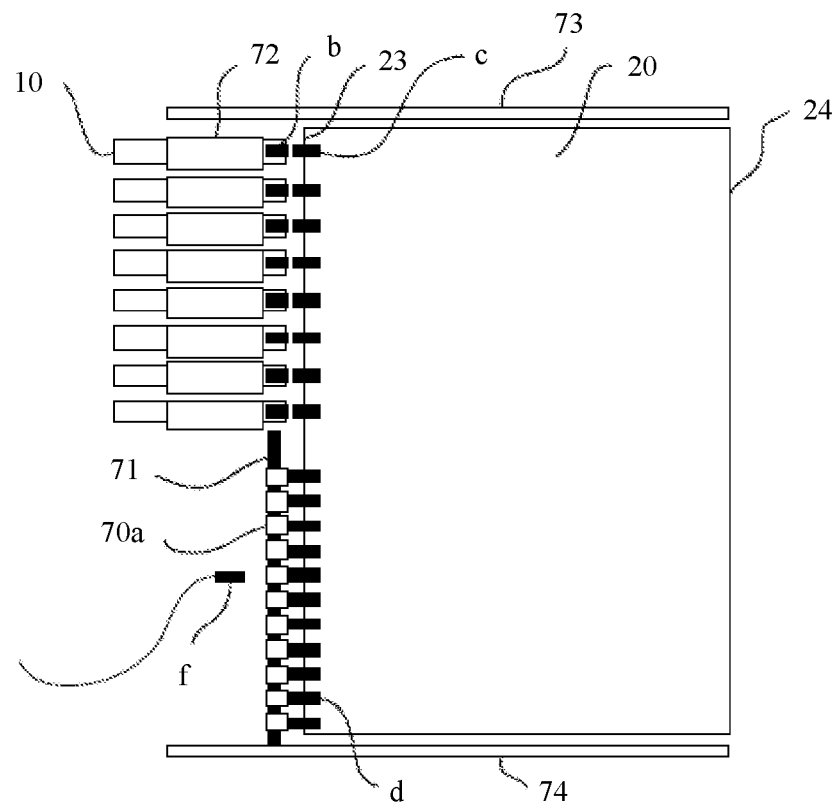
FIG. 8a is a schematic structural diagram of yet another optical backplane system according to an embodiment of the present invention.

It should be noted that the structure of the support frame provided in this embodiment of the present invention is not limited to the structures of the support frames in FIG. 6 and FIG. 7. For example, a structure, shown in FIG. 8a, of a support frame used by the optical backplane system may be alternatively used. As shown in FIG. 8a, a support frame 70 includes a support plate 71, two side plates (not shown in the figure), and a plurality of pairs of upper-level optical interconnection module fastening structures 72. Interface fastening slots 70a are disposed on the support plate 71, and the fourth interfaces d disposed on the first panel 23 are disposed in the interface fastening slots 70a. The side plates are disposed on two sides of upper-level support modules 10, each pair of upper-level optical interconnection module fastening structures 72 are oppositely fastened to the two side plates, an upper-level optical interconnection module carrying slot 70b is formed between each pair of upper-level optical interconnection module fastening structures 72, so that the upper-level optical interconnection module carrying slots 70b are disposed on a first region (namely, an upper region) of the support frame 70, and the interface fastening slots 70a are disposed on a second region (namely, a lower region) of the support frame 70.

Figure 8B:
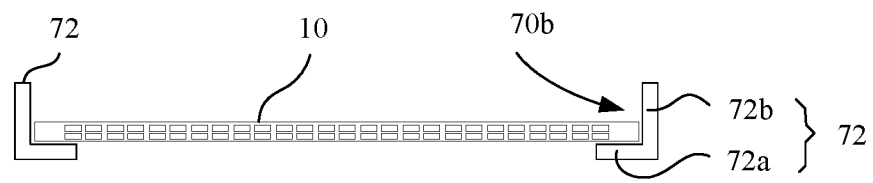
Figure 8C:
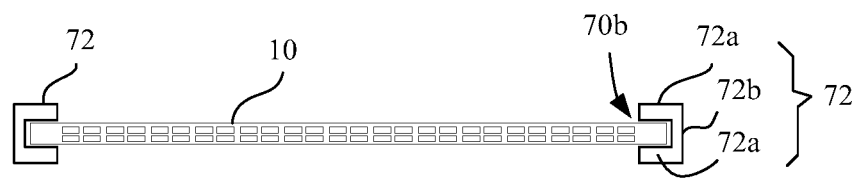

FIG. 8b and FIG. 8c each show an upper-level optical interconnection module fastening structure 72. As shown in FIG. 8b, the upper-level optical interconnection module fastening structure 72 is an L-shaped mechanical part, the L-shaped mechanical part includes a horizontal plate 72a and a vertical plate 72b that are perpendicular and connected to each other, the vertical plate 72b is fastened to a side plate, and the horizontal plate 72a is configured to support the upper-level optical interconnection module 10. As shown in FIG. 8C, the upper-level optical interconnection module fastening structure 72 is a mechanical part shaped like an upper part of H. The mechanical part shaped like the upper part of H includes a vertical plate 72b and a pair of horizontal plates 72a that are disposed in parallel. The vertical plate 72b is perpendicular to the pair of horizontal plates 72a and connected to one side of each of the horizontal plates 72a. The vertical plate 72b is fastened to a side plate, and the upper-level optical interconnection module 10 is located between a pair of horizontal plates 72a.

In addition, referring to FIG. 8a again, the support frame 70 may further include a top plate 73 and a bottom plate 74 that are oppositely disposed, all the support plate 71 and the side plates are perpendicular and fastened to the bottom plate 74, and the two side plates are perpendicular to and connected between the top plate 73 and the bottom plate 74.

It should be noted that the support frames shown in FIG. 8a to FIG. 8c are also applicable to the optical backplane system shown in FIG. 7. In addition, the upper-level optical interconnection module fastening structure may be alternatively fastened to the first support plate 61 in FIG. 6 or the first support plate 61' in FIG. 7, to better support the upper-level optical interconnection module.

The following describes an on-line upgrade process of the optical backplane system provided in the embodiments of the present invention. During initial deployment, when a system capacity requirement is not large (that is, a quantity of needed switching modules is not large), small-scale lower-level optical interconnection modules of single-level switching may be used to form the optical backplane system, and when a capacity of the optical backplane system is insufficient, large-scale lower-level optical interconnection modules of single-level switching, and even lower-level optical interconnection modules of back-to-back switching, three-level switching, or switching of more levels are used for upgrading. A specific upgrading process is as follows:

Step 1: Transfer service traffic carried on processing modules connected to a first lower-level optical interconnection module (which may be any lower-level optical interconnection module) to processing modules connected to another lower-level optical interconnection module, remove all fiber interfaces of the processing modules connected to the first lower-level optical interconnection module from the first lower-level optical interconnection module, and then remove the first lower-level optical interconnection module. During system design, there are usually redundant switching resources. Therefore, the service traffic carried on the processing modules connected to the first lower-level optical interconnection module can be transferred to processing modules connected to another lower-level optical interconnection module.

Step 2: Plug, into a position from which the first lower-level optical interconnection module is removed, a lower-level optical interconnection module having more third interfaces and fourth interfaces, and then plug the fiber interfaces of the processing modules that are removed in step 1, where some new processing modules may be plugged into and connected to remaining fourth interfaces (that is, unused fourth interfaces). If the new lower-level optical interconnection module is of multi-level switching, new processing modules are further connected to fifth interfaces of the new lower-level optical interconnection module. After all processing modules are normally started, the processing modules may be used to carry service traffic.

Step 3: Upgrade remaining lower-level optical interconnection modules one by one according to step 1 and step 2.

Step 4: After all lower-level optical interconnection modules are upgraded, connect to more upper-level optical interconnection modules by using third interfaces of the lower-level optical interconnection modules, to complete upgrade of the optical backplane system.

An upper-level optical interconnection module added in the upgraded optical backplane system may be connected to more processing modules, so as to implement on-line upgrade of a switching bandwidth capacity of the optical backplane system. It can be learned that redundant switching resources are designed in the lower-level optical interconnection modules, so that impact caused to service traffic in an upgrade process can be completely avoided.

Figure 9:
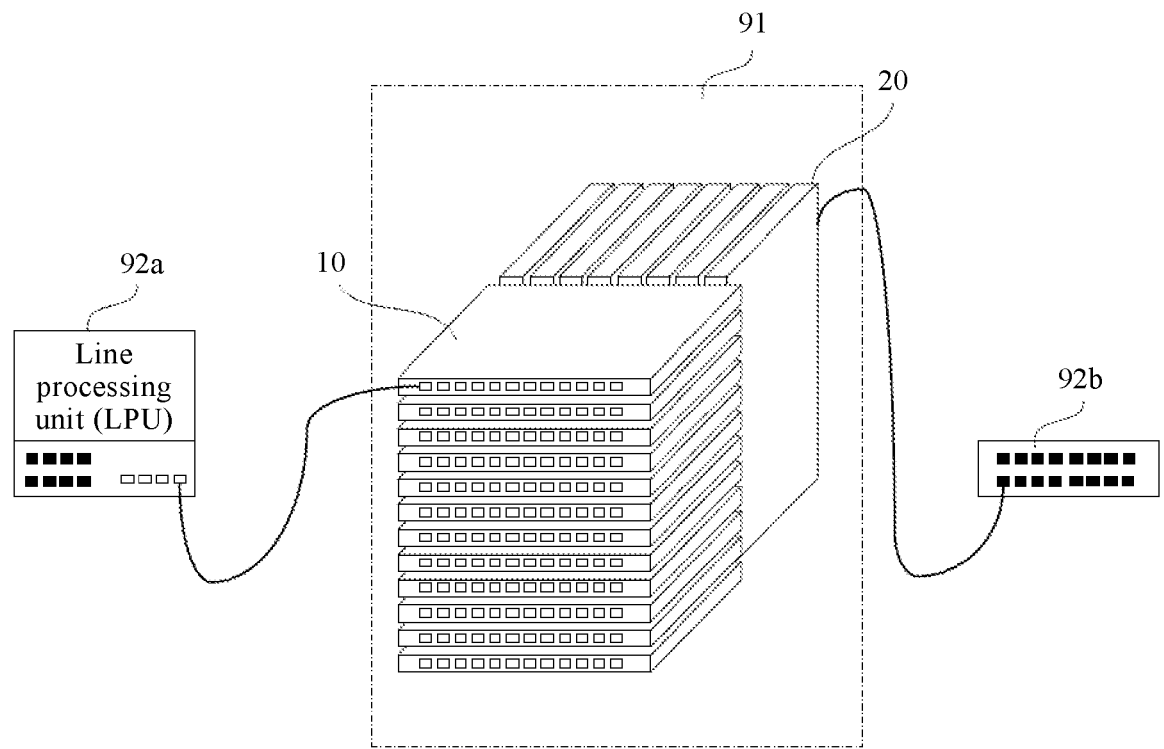
FIG. 9 is a schematic structural diagram of a switching system according to an embodiment of the present invention.

FIG. 9 is a schematic structural diagram of a switching system according to an embodiment of the present invention. As shown in FIG. 9, the switching system includes an optical backplane system 91 and processing modules. The processing modules are connected to the optical backplane system 91. For a structure of the optical backplane system 91, refer to descriptions of the embodiments in FIG. 1 to FIG. 8, and details are not described herein again.

The processing modules may include a line processing module 92a and a switching module 92b, the line processing module 92a is connected to first interfaces of upper-level optical interconnection modules 10, and the switching module 92b is connected to fourth interfaces of lower-level optical interconnection modules 20.

The line processing module 92a may be directly connected to the optical backplane system 91, or may be connected to the optical backplane system 91 by using a fiber, a polymer optical waveguide, or the like. The switching module 92b may be directly connected to the optical backplane system 91, or may be connected to the optical backplane system 91 by using a fiber, a polymer optical waveguide, or the like.

The following provides descriptions with reference to a specific example. It is assumed that all optical connectors used in an optical backplane system are 48-wire connectors, that is, 48 optical channels (the following provides description by using a fiber as an example) may be connected. A quantity of switching side transceivers (that is, transceivers configured to connect to a switched network) of one line processing unit of an LPU is 48. In a case of non-combining, one transceiver corresponds to a two-wire fiber. Therefore, one line processing unit needs to be connected to two optical connectors. One switching unit FAB of an SFU includes 144 transceivers, and therefore six optical connectors need to be connected correspondingly.

Figure 10:
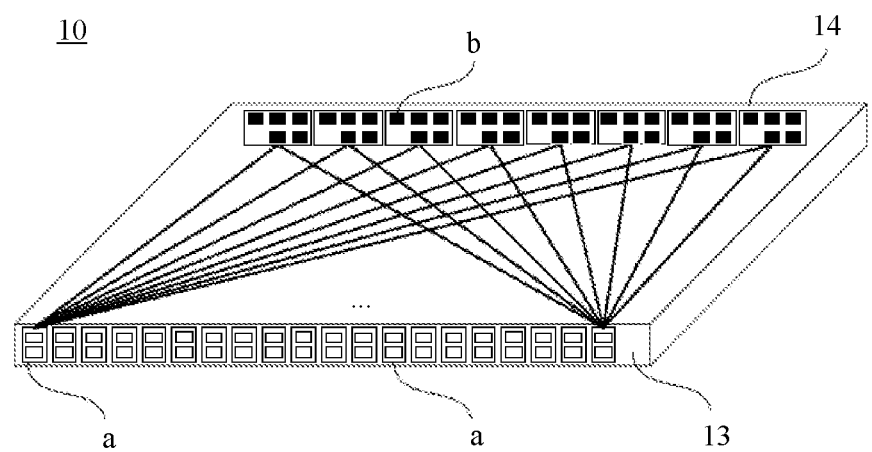
FIG. 10 shows an upper-level optical interconnection module of a specification according to an embodiment of the present invention.

First interfaces of an upper-level optical interconnection module are disposed according to a rule of correspondingly connecting to one line processing unit. Then, one first interface includes two optical connectors. Twenty first interfaces a are disposed on a first panel 13 of an upper-level optical interconnection module 10 shown in FIG. 10, and may be connected to 20 line processing units. Each first interface a includes two 48-wire optical connectors. Eight second interfaces b are disposed on a second panel 14 of the upper-level optical interconnection module 10, and may be connected to eight lower-level optical interconnection modules. Each second interface b includes five 48-wire optical connectors. A 12-wire fiber is connected between one first interface a and one second interface b.

Figure 11A:
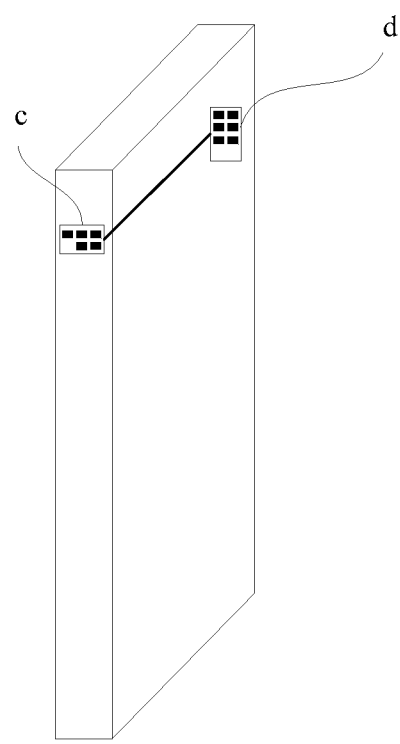
FIG. 11a to FIG. 11d respectively show lower-level optical interconnection modules of single-level switching and of different specifications.
Figure 11B:
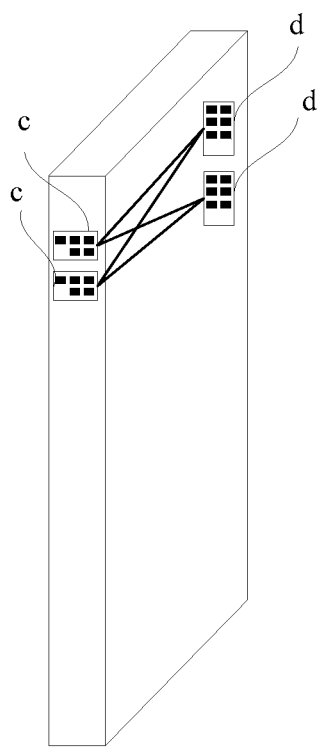
Figure 11C:
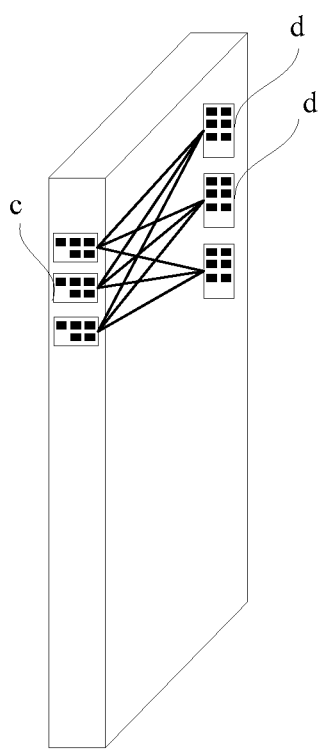
Figure 11D:
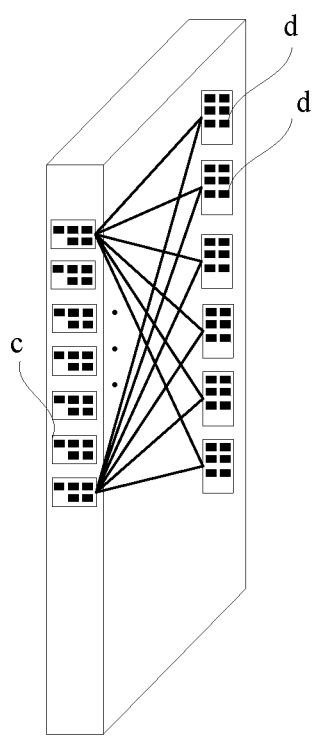

FIG. 11a to FIG. 11d respectively show lower-level optical interconnection modules of single-level switching and of different specifications. FIG. 11a shows an A-scale lower-level optical interconnection module 20A: There is one third interface c and one fourth interface d, one upper-level optical interconnection module 10 is supported, the third interface c is connected to the fourth interface d by using a fiber, and the fiber is a 240-wire fiber. In this case, a quantity of buses of a correspondingly formed optical backplane system is 1920. FIG. 11b shows a B-scale lower-level optical interconnection module 20B: There are two third interfaces c and two fourth interfaces d, two upper-level optical interconnection modules 10 are supported, one third interface c is connected to each fourth interface d by using a 120-wire fiber. In this case, a quantity of buses of a correspondingly formed optical backplane system is 3840. FIG. 11c shows a C-scale lower-level optical interconnection module 20C: There are three third interfaces c and three fourth interfaces d, three upper-level optical interconnection modules 10 are supported, one third interface c is connected to each fourth interface d by using an 80-wire fiber. In this case, a quantity of buses of a correspondingly formed optical backplane system is 5760. FIG. 11d shows a D-scale lower-level optical interconnection module 20D: There are six fourth interfaces d and seven third interfaces c, seven upper-level optical interconnection modules are supported, one third interface c is connected to each fourth interface d by using a 40-wire fiber. In this case, a quantity of buses of a correspondingly formed optical backplane system is 13440.

Figure 12:
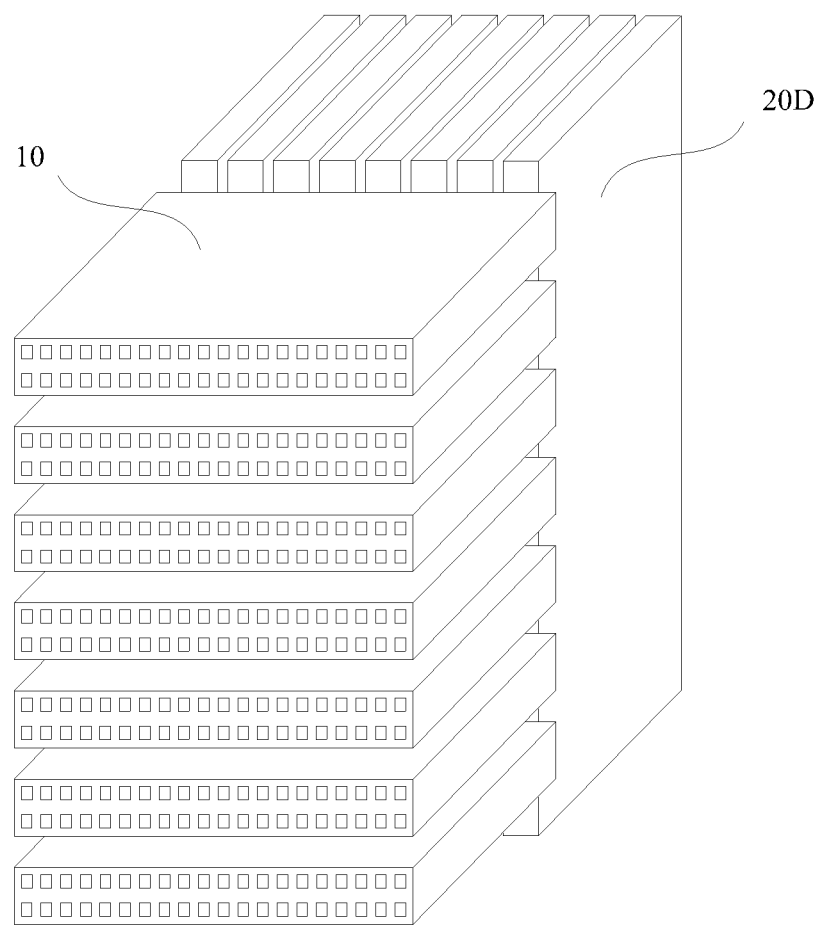
FIG. 12 is a schematic diagram of assembling the upper-level optical interconnection module in FIG. 10 and the lower-level optical interconnection module in FIG. 11d.

FIG. 12 is a schematic diagram of an optical backplane system including the lower-level optical interconnection module shown in FIG. 11d and a corresponding quantity of upper-level optical interconnection modules 10.

A user selects an initial configuration based on a requirement. For example, eight lower-level optical interconnection modules 20A and one upper-level optical interconnection module 10 are combined, or eight lower-level optical interconnection module 20B and two upper-level optical interconnection modules 10 are combined. Then, a corresponding quantity of SFUs and LPUs are configured, and are connected to corresponding first interfaces and fourth interfaces in the optical backplane system by using fibers.

All fourth interfaces of the lower-level optical interconnection modules need to be connected to switching units, and the first interfaces of the upper-level optical interconnection module are connected based on a requirement. In this way, a switching system is constructed. When all first interfaces of all upper-level optical interconnection modules are used, the lower-level optical interconnection modules may be replaced by using larger-scale lower-level optical interconnection modules to upgrade the optical backplane system.

The foregoing descriptions are merely optional embodiments of this application, but are not intended to limit this application. Any modification or improvement made according to this application should fall within the protection scope of this application.

What is claimed is:

1. An optical backplane system, wherein the optical backplane system comprises:
   a first upper-level optical interconnection module, a first lower-level optical interconnection module, and a second lower-level optical interconnection module, wherein
   the first upper-level optical interconnection module comprises M1 first interfaces and N1 second interfaces, and connection relationships exist between the M1 first interfaces and the N1 second interfaces;
   the first lower-level optical interconnection module comprises L1 third interfaces and K1 fourth interfaces, and connection relationships exist between the L1 third interfaces and the K1 fourth interfaces;
   the second lower-level optical interconnection module comprises L2 third interfaces and K2 fourth interfaces, and connection relationships exist between the L2 third interfaces and the K2 fourth interfaces;
   the first upper-level optical interconnection module is connected to one of the L1 third interfaces of the first lower-level optical interconnection module by using one of the N1 second interfaces;
   the first upper-level optical interconnection module is connected to one of the L2 third interfaces of the second lower-level optical interconnection module by using another one of the N1 second interfaces; and
   the M1 first interfaces, the K1 fourth interfaces, and the K2 fourth interfaces are configured to connect to processing modules, wherein M1, N1, K1, K2, L1, and L2 are integers greater than 1.

2. The optical backplane system according to claim 1, wherein L1 is unequal to L2.

3. The optical backplane system according to claim 1, further comprising:
   a second upper-level optical interconnection module, wherein the second upper-level optical interconnection module comprises M2 first interfaces and N2 second interfaces, and connection relationships exist between the M2 first interfaces and the N2 second interfaces, wherein
   the second upper-level optical interconnection module is connected to one of the L1 third interfaces of the first lower-level optical interconnection module by using one of the N2 second interfaces;
   the second upper-level optical interconnection module is connected to one of the L2 third interfaces of the second lower-level optical interconnection module by using another one of the N2 second interfaces; and
   the M2 first interfaces are configured to connect to processing modules, wherein both M2 and N2 are integers greater than 1.

4. The optical backplane system according to claim 1, wherein the first upper-level optical interconnection module further comprises a plurality of first optical channel sets, each first optical channel set comprises N1 groups of first optical channels, the N1 groups of first optical channels are connected to the N1 second interfaces in a one-to-one correspondence, and each first optical channel set is connected to at least one of the M1 first interfaces.

5. The optical backplane system according to claim 4, wherein each first optical channel set is connected to only one of the M1 first interfaces.

6. The optical backplane system according to claim 1, wherein
   the first lower-level optical interconnection module further comprises L1 second optical channel sets, the L1 second optical channel sets are connected to the L1 third interfaces in a one-to-one correspondence, each second optical channel set comprises a plurality of groups of second optical channels, and each group of second optical channels in the L1 second optical channel sets is correspondingly connected to one of the K1 fourth interfaces; and
   the second lower-level optical interconnection module further comprises L2 second optical channel sets, the L2 second optical channel sets are connected to the L2 third interfaces in a one-to-one correspondence, each second optical channel set comprises a plurality of groups of second optical channels, and each group of second optical channels in the L2 second optical channel sets is correspondingly connected to one of the K2 fourth interfaces.

7. The optical backplane system according to claim 6, wherein each of the L1 second optical channel sets comprises K1 groups of second optical channels, and each of the L2 second optical channel sets comprises K2 groups of second optical channels.

8. The optical backplane system according to claim 6, wherein
the K1 fourth interfaces are grouped into X1 groups, the L1 third interfaces are grouped into X1 groups, X1 is an integer greater than 1, each group of fourth interfaces in the K1 fourth interfaces are connected to a corresponding group of third interfaces, the first lower-level optical interconnection module further comprises a plurality of fifth interfaces, and the X1 groups of fourth interfaces are connected to each other by using the fifth interfaces of the first lower-level optical interconnection module; and
the K2 fourth interfaces are grouped into X2 groups, the L2 third interfaces are grouped into X2 groups, X2 is an integer greater than 1, each group of fourth interfaces in the K2 fourth interfaces are connected to a corresponding group of third interfaces, the second lower-level optical interconnection module further comprises a plurality of fifth interfaces, and the X2 groups of fourth interfaces are connected to each other by using the fifth interfaces of the second lower-level optical interconnection module.

9. The optical backplane system according to claim 1, wherein
the first lower-level optical interconnection module further comprises a first panel, the L1 third interfaces and at least some of the K1 fourth interfaces are disposed on the first panel of the first lower-level optical interconnection module; or
the second lower-level optical interconnection module further comprises a first panel, the L2 third interfaces and at least some of the K2 fourth interfaces are disposed on the first panel of the second lower-level optical interconnection module.

10. The optical backplane system according to claim 9, wherein the optical backplane system further comprises a support frame, a plurality of interface fastening slots are disposed on the support frame, and the fourth interfaces disposed on the first panel are disposed in the interface fastening slots.

11. The optical backplane system according to claim 10, wherein a plurality of upper-level optical interconnection module support slots are disposed on the support frame, the plurality of upper-level optical interconnection module support slots are located on a first region of the support frame, and the plurality of interface fastening slots are located on a second region of the support frame.

12. The optical backplane system according to claim 11, wherein the support frame comprises a first support plate, a second support plate, and a connection plate connecting the first support plate and the second support plate, the first support plate and the second support plate are located on different planes and are respectively located on two sides of the connection plate, the plurality of upper-level optical interconnection module support slots are located on the first support plate, and the plurality of interface fastening slots are located on the second support plate.

13. The optical backplane system according to claim 1, wherein the first lower-level optical interconnection module and the second lower-level optical interconnection module have a same shape and a same size.

14. The optical backplane system according to claim 1, wherein the second interfaces and the third interfaces that are connected are directly connected or connected by using adapters.

15. The optical backplane system according to claim 14, wherein a limiting and guiding apparatus is disposed between the first upper-level optical interconnection module and both the first lower-level optical interconnection module and the second lower-level optical interconnection module.

16. The optical backplane system according to claim 1, wherein the second interfaces and the third interfaces that are connected are connected by using fibers or polymer optical waveguides.

17. A switching system, comprising processing modules and the optical backplane system according to claim 1, wherein the processing modules are connected to the optical backplane system.

18. The switching system according to claim 17, wherein the processing modules are connected to the optical backplane system by using fibers or polymer optical waveguides.

19. A switching system upgrade method, applicable to the switching system according to claim 17, wherein the upgrade method comprises:
removing fiber interfaces of processing modules connected to the first lower-level optical interconnection module from the first lower-level optical interconnection module;
removing the first lower-level optical interconnection module;
plugging a new lower-level optical interconnection module into a position from which the first lower-level optical interconnection module is removed, wherein the new lower-level optical interconnection module comprises more third interfaces and fourth interfaces than the first lower-level optical interconnection module; and
connecting the removed fiber interfaces of the processing modules and the new lower-level optical interconnection module, and connecting an unused fourth interface of the new lower-level optical interconnection module and a fiber interface of a new processing module.

20. The upgrade method according to claim 19, wherein the method further comprises:
connecting a new upper-level optical interconnection module and third interfaces that are of the new lower-level optical interconnection module and to which no upper-level optical interconnection module is connected.

21. The upgrade method according to claim 19, wherein the method further comprises sequentially replacing all lower-level optical interconnection modules in a manner of replacing the first lower-level optical interconnection module.

* * * * *